US012754052B2

(12) United States Patent
Huddleston

(10) Patent No.: US 12,754,052 B2
(45) Date of Patent: Oct. 6, 2026

(54) EXPANDABLE CROSS-OVER TUBE CONNECTOR

(71) Applicant: The Ford Meter Box Company, Inc., Wabash, IN (US)

(72) Inventor: Robert W. Huddleston, Twelve Mile, IN (US)

(73) Assignee: The Ford Meter Box Company, Inc., Wabash, IN (US)

( * ) Notice: Subject to any disclaimer, the term of this patent is extended or adjusted under 35 U.S.C. 154(b) by 333 days.

(21) Appl. No.: 18/648,568

(22) Filed: Apr. 29, 2024

(65) Prior Publication Data

US 2024/0369395 A1 Nov. 7, 2024

Related U.S. Application Data

(60) Provisional application No. 63/463,122, filed on May 1, 2023.

(51) Int. Cl.
*G01F 15/18* (2006.01)
*G01F 15/00* (2006.01)

(52) U.S. Cl.
CPC ............ *G01F 15/185* (2013.01); *G01F 15/18* (2013.01); *G01F 15/005* (2013.01)

(58) Field of Classification Search
CPC ....... G01F 15/185; G01F 15/18; G01F 15/005
USPC ............................................................ 73/201
See application file for complete search history.

(56) References Cited

U.S. PATENT DOCUMENTS

2010/0200096 A1* 8/2010 Cimberio .............. G01F 15/185 137/884
2021/0356309 A1* 11/2021 Huddleston ........... F16K 27/067

OTHER PUBLICATIONS

The Ford Meter Box Co., Inc., Drawing No. 31083-002; "S" Tube, 13/16" OD Copper; Dated Apr. 28, 2015 and May 2, 2013.
Ford Tandem Coppersetters, Catalog Sec F-26; Tandem Coppersetters and Resetters; Undated.
The Ford Meter Box Co., Inc., Drawing No. A-95664-003; U-Tube 1" Tandem Coil Pitsetter; Dated Aug. 4, 2016.
The Ford Coil Pit Setter; Single and Tandem Setting; Catalog Section FA, p. 22; Undated.

* cited by examiner

*Primary Examiner* — Peter J Macchiarolo
*Assistant Examiner* — John M Royston
(74) *Attorney, Agent, or Firm* — Barnes & Thornburg LLP

(57) ABSTRACT

A meter pit setter assembly that includes an expandable S-tube or U-tube. The expandable S-tube or U-tube includes a first arcuate or angled tube that has a first opening at a first end of the first arcuate tube and a second opening at a second end of the first arcuate tube. The second end of the first arcuate tube is connected to a telescoping tube member of an expansion coupling portion. A second arcuate or angled tube has a first opening at a first end of the second arcuate tube and a second opening at a second end of the second arcuate tube. The second end of the second arcuate tube is connected to a body member of the expansion coupling portion. The telescoping tube member of the expansion coupling portion is coupled to the body member of the expansion coupling portion. The body member of the expansion coupling portion is movable with respect to the telescoping tube member between an extended position and a retracted position to provide variable lengths of the expandable S-tube or U-tube.

20 Claims, 18 Drawing Sheets

EXPANDABLE CROSS-OVER TUBE CONNECTOR

RELATED APPLICATIONS

The present Application relates to and claims priority to U.S. Provisional Patent Application, Ser. No. 63/463,122, filed on May 1, 2023, entitled "Expandable Cross-Over Tube Connector." The subject matter disclosed in that Provisional Application is hereby expressly incorporated into this Application by reference.

TECHNICAL FIELD AND SUMMARY

The present disclosure is directed to meter pit setter assemblies and the like, and, particularly, to expandable passageway systems that can accommodate pressure regulator valves of varying lengths.

A meter pit setter assembly includes enclosures typically placed in the ground outside of a building, house, or dwelling. Such meter pit setter assemblies include a pit that contains a water meter used to determine the volume of water that enters the building, house, or dwelling. By placing the pit and meter in the ground, the meter can be protected from freezing weather and other environmental hazards. Typically, the pits include a lid that can be lifted to access the meter underneath.

Also included in the pit is a meter setter that connects the meter to the water source and dwelling. In some circumstances, a pressure regulator valve needs to be included in the fluid path between the water source and the meter. Because the pits have limited space inside, cross-over tubes, such as S-tubes or U-tubes, are employed to fluidly connect the pressure regulating valve between the meter and a ball valve, all inside the pit. An issue with this configuration is that pressure regulating valves may come in a variety of different lengths. This may affect the ability of tubes to connect the pressure regulating valve to the ball valve. Such pressure regulating valves may come in lengths of about $3\frac{3}{8}$" to about $\frac{5}{38}$." Because of the limited space inside the pit, however, assembling or replacing these pressure regulating valves may become a challenge if the surrounding tubing is not pre-sized to accommodate the valve's length.

Accordingly, an illustrative embodiment of the present disclosure provides a meter pit setter assembly that includes an inlet that leads to a ball valve coupling that is in fluid communication with a pressure regulating valve, the pressure regulating valve is also fluidly attached to a coupling fluidly attached to an expandable S-tube. The expandable S-tube comprises a first arcuate tube that has a first opening at a first end of the first arcuate tube and a second opening at a second end of the first arcuate tube and spaced apart from the first opening of the first arcuate tube. The first opening of the first arcuate tube is oriented about parallel to the second opening of the first arcuate tube; the first end of the first arcuate tube is coupled to a coupling nut of the first arcuate tube; the second end of the first arcuate tube is connected to an expansion coupling portion; the second end of the first arcuate tube connects to a telescoping tube member of the expansion coupling portion; a second arcuate tube that has a first opening at a first end of the second arcuate tube and a second opening at a second end of the second arcuate tube and spaced apart from the first opening of the second arcuate tube; the first opening of the second arcuate tube is oriented about parallel to the second opening of the second arcuate tube; the first end of the second arcuate tube is coupled to a coupling nut of the second arcuate tube;

the second end of the second arcuate tube is connected to the expansion coupling portion; the second end of the second arcuate tube connects to a body member of the expansion coupling portion; the telescoping tube member of the expansion coupling portion is coupled to the body member of the expansion coupling portion; the body member of the expansion coupling portion is linearly movable with respect to the telescoping tube member between an extended position and a retracted position to provide variable lengths of the expandable S-tube; the expansion coupling portion provides fluid communication from the first arcuate tube to the second arcuate tube; and the first arcuate tube, the second arcuate tube, and the expansion coupling portion form an S-shaped structure of the expandable S-tube.

In the above and other embodiments, the meter pit setter assembly may further comprise: the telescoping tube member further includes one or more O-rings located between an inner periphery surface of the body member and an outer periphery surface of the telescoping tube member to create one or more seals between the body member and the telescoping tube member to prevent fluid leaking between the body member and the telescoping tube member as the telescoping tube member and the body member move between the extended position and the retracted position with respect to each other; the telescoping tube member further includes one or more O-rings located between an outer periphery surface of the body member and an inner periphery surface of the telescoping tube member to create one or more seals between the body member and the telescoping tube member to prevent fluid leaking between the body member and the telescoping tube member as the telescoping tube member and the body member move between the extended position and the retracted position with respect to each other; the telescoping tube member is retractable within the body member; a snap ring positioned between the inner periphery surface of the body member and the outer periphery surface of the telescoping tube member to limit an extent to which the body member and the telescoping tube member extend from each other; a ledge extending from the telescoping tube member that creates a protrusion therefrom, and is configured to engage the snap ring to prevent the body member and the telescoping tube member from decoupling from each other; the coupling nut of the first arcuate tube is configured to fluidly attach to a meter and the coupling nut of the second arcuate tube is configured to fluidly attach to the coupling for the pressure regulating valve; the first arcuate tube and the second arcuate tube are the same shape; and an outer periphery surface of the telescoping tube member includes threads that correspond to and engage threads of an inner periphery surface of the body member such that rotation of either the body member or the telescoping tube member, with respect to each other, linearly extends or retracts the body member with respect to the telescoping tube member, dependent on a direction of the rotation.

Another illustrative embodiment of the present disclosure provides a meter pit setter assembly that includes an inlet that leads to a ball valve coupling that is in fluid communication with a pressure regulating valve, the pressure regulating valve is also fluidly attached to a coupling fluidly attached to an expandable S-tube. The expandable S-tube comprises a first arcuate tube that has a first opening at a first end of the first arcuate tube and a second opening at a second end of the first arcuate tube and spaced apart from the first opening of the first arcuate tube; the second end of the first arcuate tube is connected to an expansion coupling portion; the second end of the first arcuate tube connects to a telescoping tube member of the expansion coupling portion; a second arcuate tube that has a first opening at a first end of the second arcuate tube and a second opening at a second end of the second arcuate tube and spaced apart from the first opening of the second arcuate tube; the second end of the second arcuate tube is connected to the expansion coupling portion; the second end of the second arcuate tube connects to a body member of the expansion coupling portion; the telescoping tube member of the expansion coupling portion is coupled to the body member of the expansion coupling portion; the body member of the expansion coupling portion is movable with respect to the telescoping tube member between an extended position and a retracted position to provide variable lengths of the expandable S-tube; the expansion coupling portion provides fluid communication from the first arcuate tube to the second arcuate tube; and the first arcuate tube, the second arcuate tube, and the expansion coupling portion form an S-shaped structure of the expandable S-tube.

In the above and other embodiments, the meter pit setter assembly may further comprise: the first arcuate tube is configured to fluidly attach to a meter and the second arcuate tube is configured to fluidly attach to the coupling for the pressure regulating valve; the first arcuate tube is configured to fluidly attach to the coupling for the pressure regulating valve and the second arcuate tube is configured to fluidly attach to a meter; the first opening of the first arcuate tube is oriented about parallel to the second opening of the first arcuate tube and wherein the first end of the first arcuate tube is coupled to a coupling nut of the first arcuate tube; the first opening of the second arcuate tube is oriented about parallel to the second opening of the second arcuate tube and wherein the first end of the second arcuate tube is coupled to a coupling nut of the second arcuate tube; and the body member of the expansion coupling portion is linearly movable with respect to the telescoping tube member.

Another illustrative embodiment of the present disclosure provides a meter pit setter assembly that includes an inlet that leads to a ball valve coupling that is in fluid communication with a pressure regulating valve, the pressure regulating valve is also fluidly attached to a coupling fluidly attached to an expandable U-tube. The expandable U-tube comprises a first angled tube that has a first opening at a first end of the first angled tube and a second opening at a second end of the first angled tube and spaced apart from the first opening of the first angled tube. The first opening of the first angled tube is oriented tangential to the second opening of the first angled tube; the second end of the first angled tube is connected to an expansion coupling portion; the second end of the first angled tube connects to a telescoping tube member of the expansion coupling portion; a second angled tube that has a first opening at a first end of the second angled tube and a second opening at a second end of the second angled tube and spaced apart from the first opening of the second angled tube; the first opening of the second angled tube is oriented tangential to the second opening of the second angled tube; the second end of the second angled tube is connected to the expansion coupling portion; the second end of the second angled tube connects to a body member of the expansion coupling portion; the telescoping tube member of the expansion coupling portion is coupled to the body member of the expansion coupling portion; the body member of the expansion coupling portion is linearly movable with respect to the telescoping tube member between an extended position and a retracted position to provide variable lengths of the expandable U-tube; the expansion coupling portion provides fluid communication from the first angled tube to the second angled tube; and the first angled tube, the second angled tube, and the expansion coupling portion form an U-shaped structure of the expandable U-tube.

In the above and other embodiments, the meter pit setter assembly may further comprise: the first opening of the first angled tube is oriented about perpendicular to the second opening of the first angled tube and wherein the first opening of the second angled tube is oriented about perpendicular to the second opening of the second angled tube; the first angled tube is configured to fluidly attach to a meter and the second angled tube is configured to fluidly attach to the coupling for the pressure regulating valve; the first angled tube is configured to fluidly attach to the coupling for the pressure regulating valve and the second angled tube is configured to fluidly attach to a meter; and an outer periphery surface of the telescoping tube member includes threads that correspond to and engage threads of an inner periphery surface of the body member such that rotating either the body member for the telescoping tube member such that rotation of either the body member or the telescoping tube member, with respect to each other, linearly extends or retracts the body member, with respect to the telescoping tube member, dependent on a direction of the rotation.

Additional features of the expandable cross-over tube connector will become apparent to those skilled in the art upon consideration of illustrative embodiments of carrying out the expandable cross-over tube connector as presently perceived.

BRIEF DESCRIPTION OF THE DRAWINGS

The concepts described in the present disclosure are illustrated by way of example, and not by way of limitation, in the accompanying figures. For simplicity, and clarity of illustration, elements illustrated in the figures are not necessarily drawn to scale. For example, and clarity, the dimensions of some elements may be exaggerated relative to other elements. Further, where considered appropriate, reference labels may be repeated among the figures to indicate corresponding or analogous elements.

Figure 1:
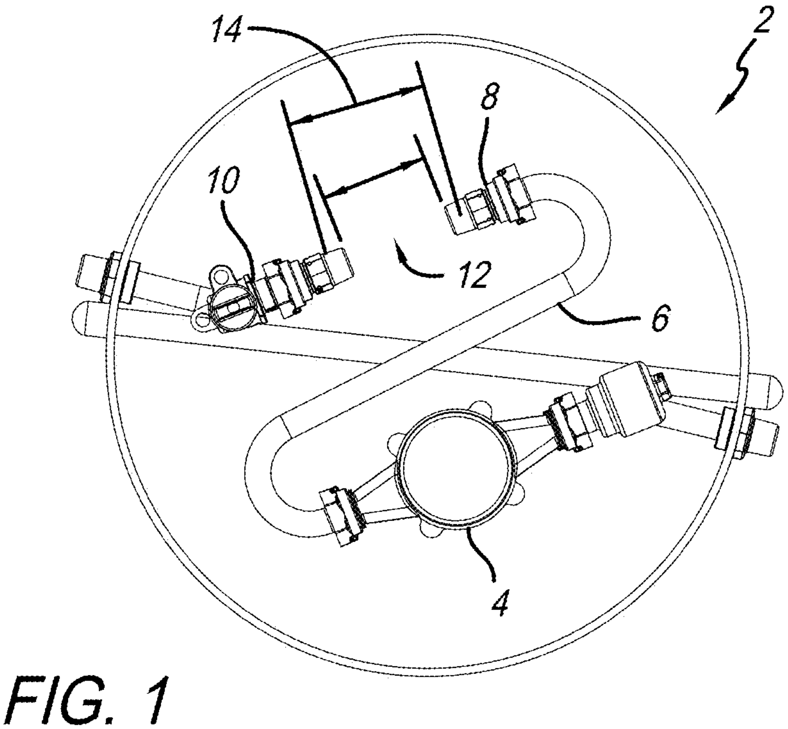
FIG. 1 PRIOR ART
FIG. 1 is a top view of a portion of a prior art meter pit setter assembly.

Corresponding reference characters indicate corresponding parts throughout the several views. The exemplification set out herein illustrates embodiments of the expandable cross-over tube connector, and such exemplification is not to be construed as limiting the scope of the expandable cross-over tube connector in any manner.

DISCLOSURE OF ILLUSTRATIVE EMBODIMENTS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a meter pit setter assembly. The meter pit setter assembly illustratively includes an inlet tube leading to a ball valve coupling that is in fluid communication with a pressure regulating valve. The pressure regulating valve is also fluidly attached to a coupling fluidly attached to an expandable cross-over tube connector in the form of either an S-tube or a U-tube, which is in communication with the meter. An expansion coupling is part of either the S-tube or U-tube. The expansion coupling includes a telescoping member that is extendable and retractable with respect to a body portion. In an embodiment, the expansion coupling is located between two tube parts of the S-tube or U-tube so that the tube may be movable towards or away from the ball valve.

This means that during installation or repair, when using a shorter pressure regulating valve, a portion of the S-tube or U-tube can move closer to the ball valve to connect the coupling to the pressure regulating valve, which can also be coupled to the ball valve. Conversely, if a longer pressure regulating valve is used, the expansion coupling moves a portion of the S-tube or U-tube away from the ball valve. This creates further distance between the coupling and ball valve to accommodate this longer pressure regulating valve.

In an illustrative embodiment, an S-tube assembly is provided to fluidly attach to the meter. The S-tube assembly includes a first arcuate tube that may have spaced apart openings generally directed about parallel to each other. One end of the tube is coupled to a coupling nut while the other end connects to either the body or telescoping member portion of the expansion coupling. A second arcuate tube that many also have spaced apart openings directed generally parallel to each other may extend from the expansion coupling opposite the first arcuate tube. This configuration allows for the S-tube assembly to have a similar configuration of a conventional S-tube, but with the additional functionality of being extendable and retractable to accommodate different length pressure regulating valve in the pit.

In another illustrative embodiment, the meter pit setter assembly may include an expandable U-tube assembly. Depending on the needs and the configuration of the meter pit setter assembly, fluidly connecting the meter with the pressure regulating valve may be better accomplished using the expandable U-tube assembly. In this case, a first bent or elbow-type tube with a coupling at a first opening with the tube extending transverse to a second opening that is coupled to either the body or telescoping member of the expansion coupling. A second bent or elbow-type tube may then extend from the expansion coupling, as well as opposite the first bent or elbow-type tube. This configuration forms the U-shape of the tube. An elbow grip joint or other like coupling can be attached to the U-tube assembly's ends. Either one or both ends can be moved (typically the grip joint end) towards or away from each other to accommodate pressure regulating valves of differing lengths.

Employing either the S-tube or U-tube assembly configurations, an installer can more conveniently attach the pressure regulating valve of any of the variety of lengths to the ball valve and coupling in the meter pit setter assembly.

A top view of a portion of a meter pit setter assembly 2 is shown in prior art FIG. 1. In this view, a meter 4, such as a water meter, is installed in meter pit setter assembly 2. A conventional S-tube 6 extends between meter 4 and coupling 8 that is spaced apart from ball valve 10. Space 12, between coupling 8 and ball valve 10, is intended to accommodate a pressure regulating valve (not shown). The issue is that pressure regulating valves may come in a variety of lengths, but the distance between ball valve 10 and coupling 8, as identified by distance 14, accommodates a pressure regulating valve of only a single length. Because S-tube 6 creates a fixed distance between coupling 8 and ball valve 10, having a pressure regulating valve the wrong length can pose a challenge when installing it in meter pit setter assembly 2.

Figure 2:
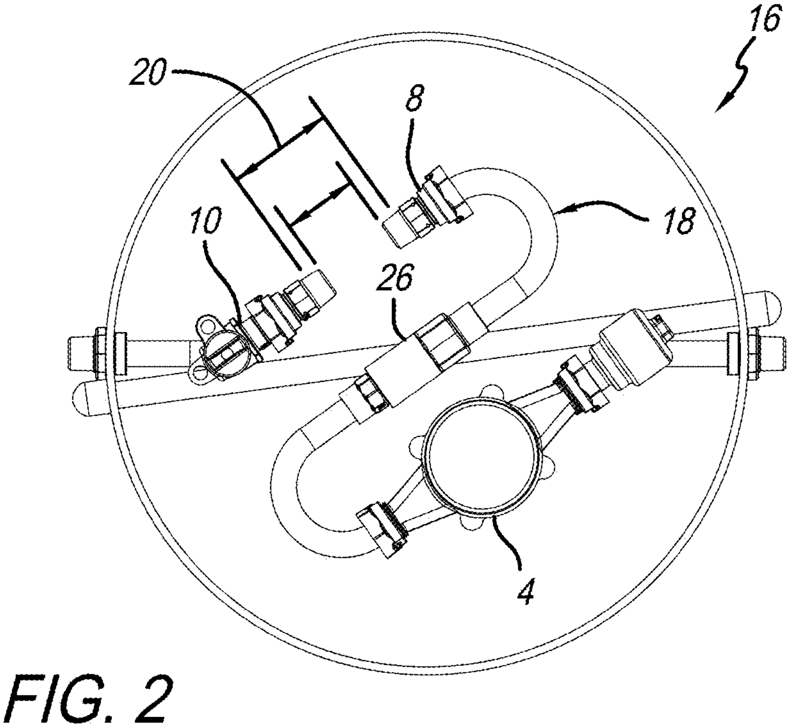
FIG. 2 PRIOR ART
FIG. 2 is a top view of a meter pit setter assembly.
Figure 3:
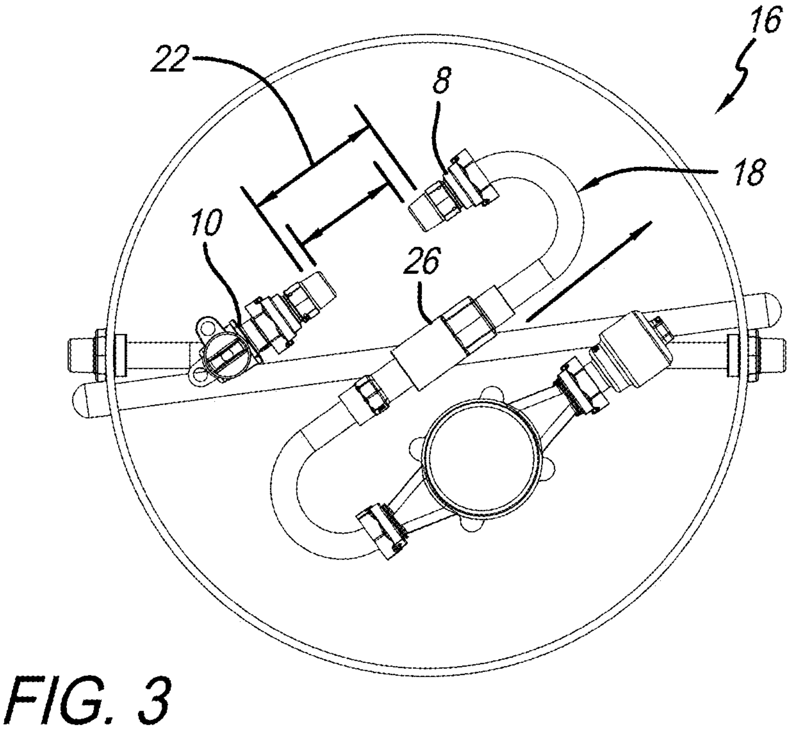
FIG. 3 PRIOR ART
FIG. 3 is another top view of a meter pit setter assembly.
Figure 4:
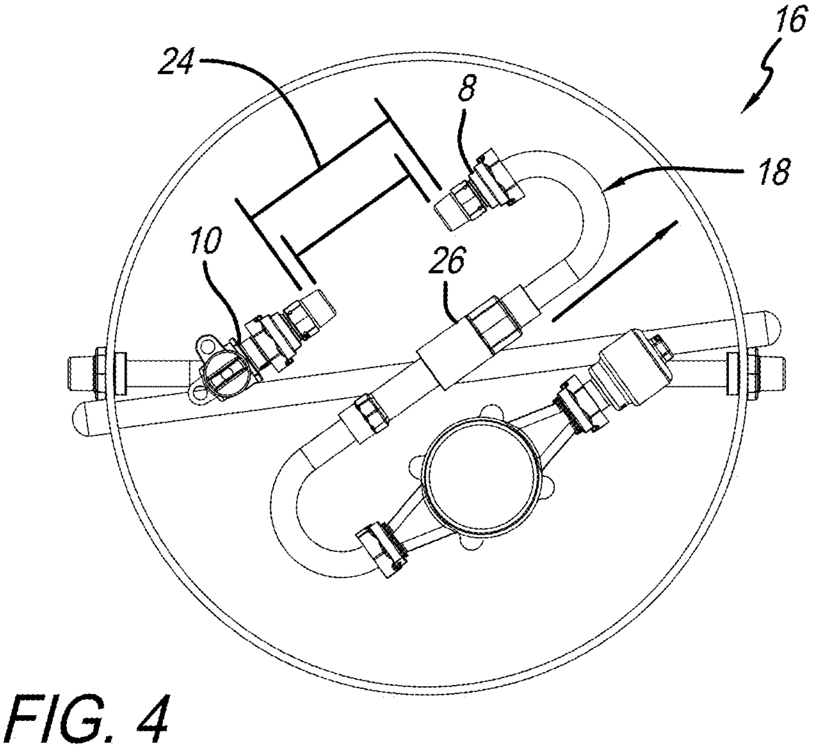
FIG. 4 PRIOR ART
FIG. 4 is another top view of a meter pit setter assembly.

Top views of meter pit setter assembly 2, according to the present disclosure, are shown in FIGS. 2, 3, and 4. In these views, an expandable S-tube 18 is coupled to meter 4 and coupling 8 at opposite ends. Expandable S-tube 18 can move coupling 8 either closer to or further away from ball valve 10 to a variety of distances, such as distances 20, 22, or 24 as illustratively shown in FIGS. 2, 3, and 4. An expansion coupling 26 can be extended or retracted to move coupling

8 away from or towards ball valve 10 depending upon the length requirements needed for the pressure regulating valve.

As shown in the top view of meter pit setter assembly 16 in FIG. 2, for example, expansion coupling 26 is fully retracted, which positions coupling 8 at the shortest distance 20, between it and ball valve 10. With respect to the top view of meter pit setter assembly 16 in FIG. 3, expansion coupling 26 is extended to move coupling 8 an intermediate distance 22, between coupling 8 and ball valve 10. With respect to the top view of meter pit setter assembly 16 in FIG. 4, expansion coupling 26 is expanded even further, thereby moving coupling 8 a farther distance from ball valve 10 to accommodate a pressure regulating valve of even longer length.

Figure 5:
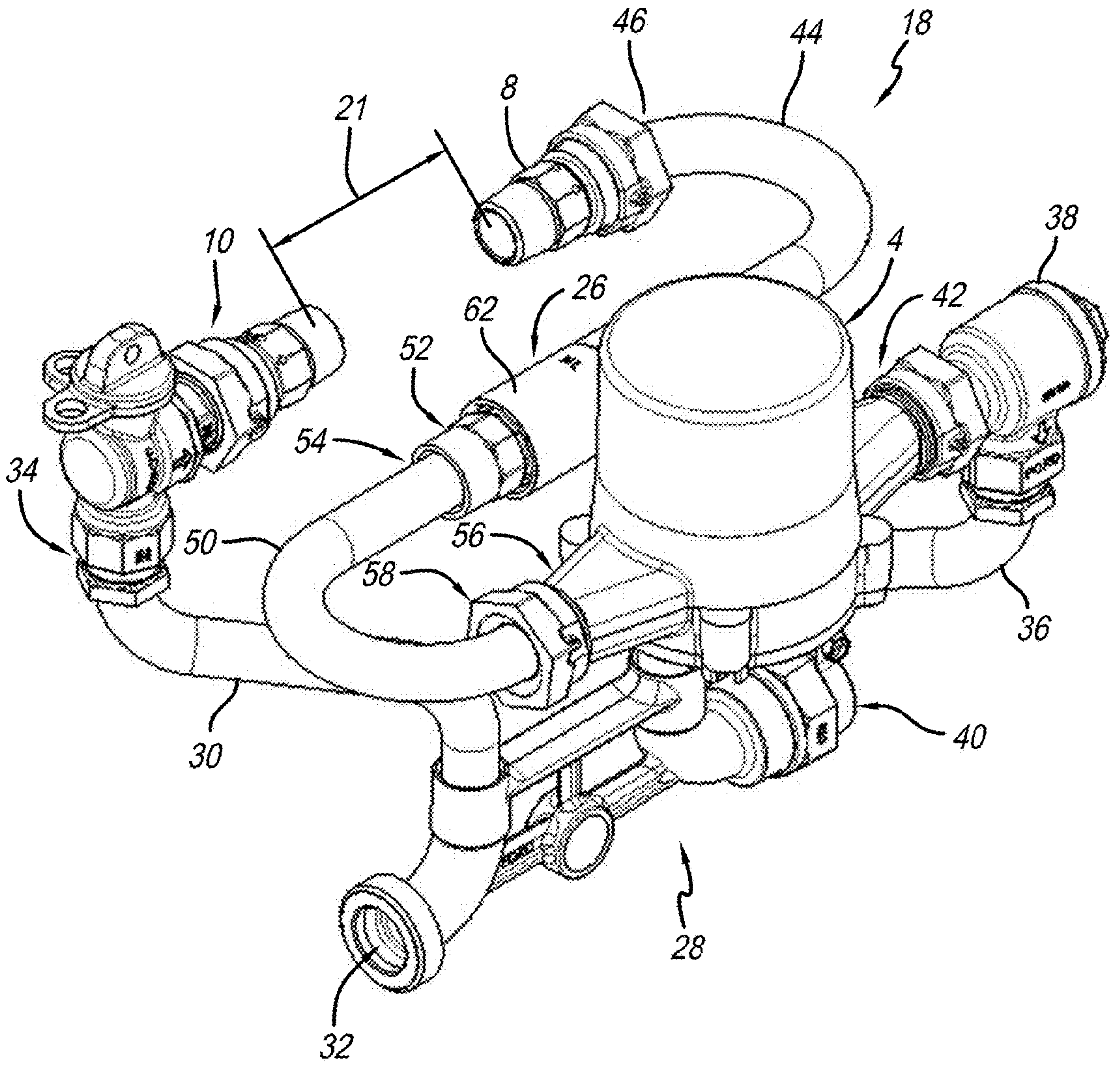
FIG. 5 is an isolated perspective view of a meter fluidly coupled to a meter setter and an expandable S-tube.

An isolated perspective view of meter 4 fluidly coupled to meter setter 28 and fluidly coupled to expandable S-tube 18 is shown in FIG. 5. Meter setter 28 includes an inlet tube 30 that is in communication with a fluid source at inlet end 32 and fluidly couples to ball valve 10 at end 34. Meter setter 28 also includes an outlet tube 36 that is in fluid communication with check valve 38 and outlet end 40. Check valve 38 is in fluid communication with outlet 42 of meter 4. Outlet end 40 of outlet tube 36 is configured to be in fluid communication with the building or dwelling that is being provided fluid.

Figure 6:
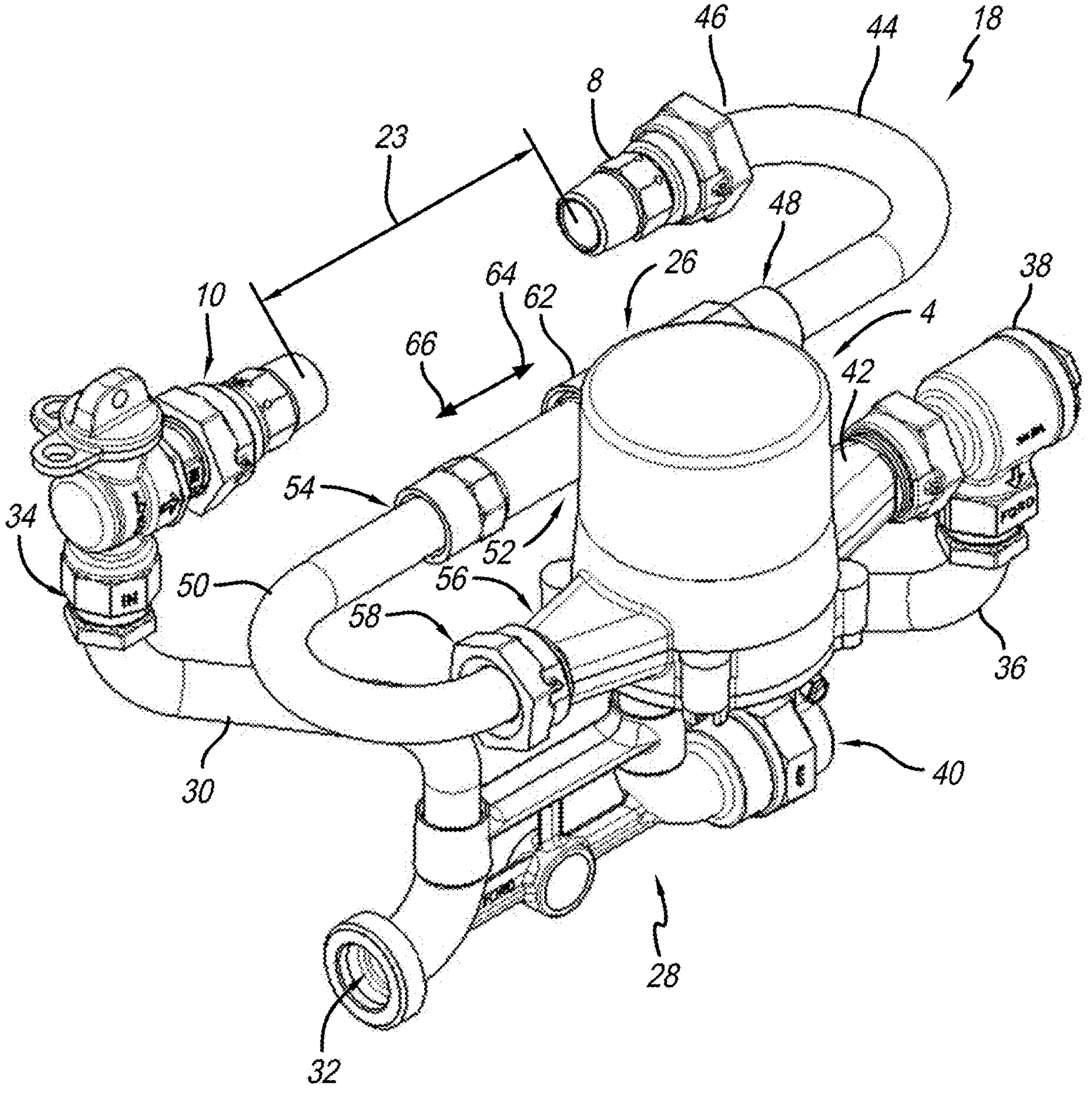
FIG. 6 is another isolated perspective view of a meter fluidly coupled to a meter setter and an expandable S-tube.

S-tube 18 includes an arcuate inlet tube 44 that is coupled to both coupling 8 at end 46 and expansion coupling 26, at end 48 (see FIG. 6). Opposite arcuate inlet tube 44 is arcuate outlet tube 50 that is coupled to a telescoping tube member 52 at end 54, and coupled to inlet 56 of meter 4 at end 58. In the configuration shown, a distance 21, illustratively sized for about a 3¾" long pressure regulating valve (not shown) between ball valve 10 and coupling 8. When coupling 8 is this distance 21 from ball valve 10, telescoping tube member 52 is extended within body 62 of expansion coupling 26 as shown. The more telescoping tube member 52 is retracted within body 62 of expansion coupling 26, the less distance there is between ball valve 10 and coupling 8. In this illustrative embodiment, fluid from a fluid source enters inlet end 32 of inlet tube 30 and flows up toward ball valve 10. If ball valve 10 is in its open position, fluid will flow through it and then through a pressure regulating valve and into coupling 8. The fluid then flows through expandable S-tube 18 starting with arcuate inlet tube 44, through expansion coupling 26, then through arcuate outlet tube 50, and into meter 4 at inlet 56. The fluid then exits meter 4 at outlet 42 and through check valve 38. Having check valve 38 located downstream of meter 4, prevents any fluid downstream of check valve 38 from flowing back into meter 4. The fluid that flows through check valve 38 then moves through outlet tube 36, and out outlet end 40 towards the building or dwelling.

Another isolated perspective view of meter 4 fluidly coupled to meter setter 28 and fluidly coupled to expandable S-tube 18 is shown in FIG. 6. This view is similar to that of FIG. 5 except that body 62 of expansion coupling 26 has moved in direction 64, thereby moving arcuate inlet tube 44 in direction 64 as well. This causes coupling 8 to move further away from ball valve 10, in this case a distance 23 to accommodate a larger size pressure regulating valve (not shown). Illustratively, the pressure regulating valve may be about 5½" long. Accordingly, all that needs to be done by an installer to install either a longer or shorter pressure regulating valve is to move body 62 of expansion coupling 26 in either directions 64 or 66, as needed, depending on the size of the pressure regulating valve. If it is short, the installer simply moves arcuate inlet tube 44 in direction 66. Conversely, if the pressure regulating valve is longer, the installer moves arcuate inlet tube 44 in direction 64 to accommodate the larger pressure regulating valve between coupling 8 and ball valve 10. In this illustrative embodiment, arcuate outlet tube 50 may remain stationary as it is coupled at end 58 to inlet 56 of meter 4 and to expansion coupling 26 at end 54. It is arcuate inlet tube 44 that is movable by virtue of telescoping tube member 52 and body 62 being movable with respect to each other.

Figure 7:
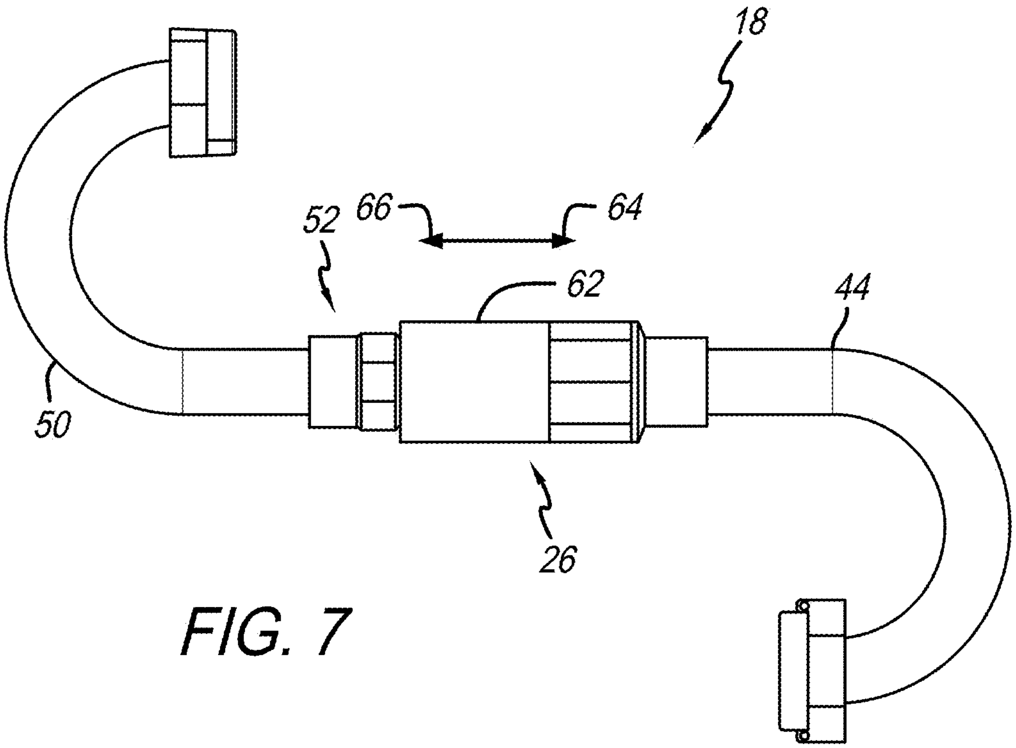
FIG. 7 is a top view of the expandable S-tube.
Figure 8:
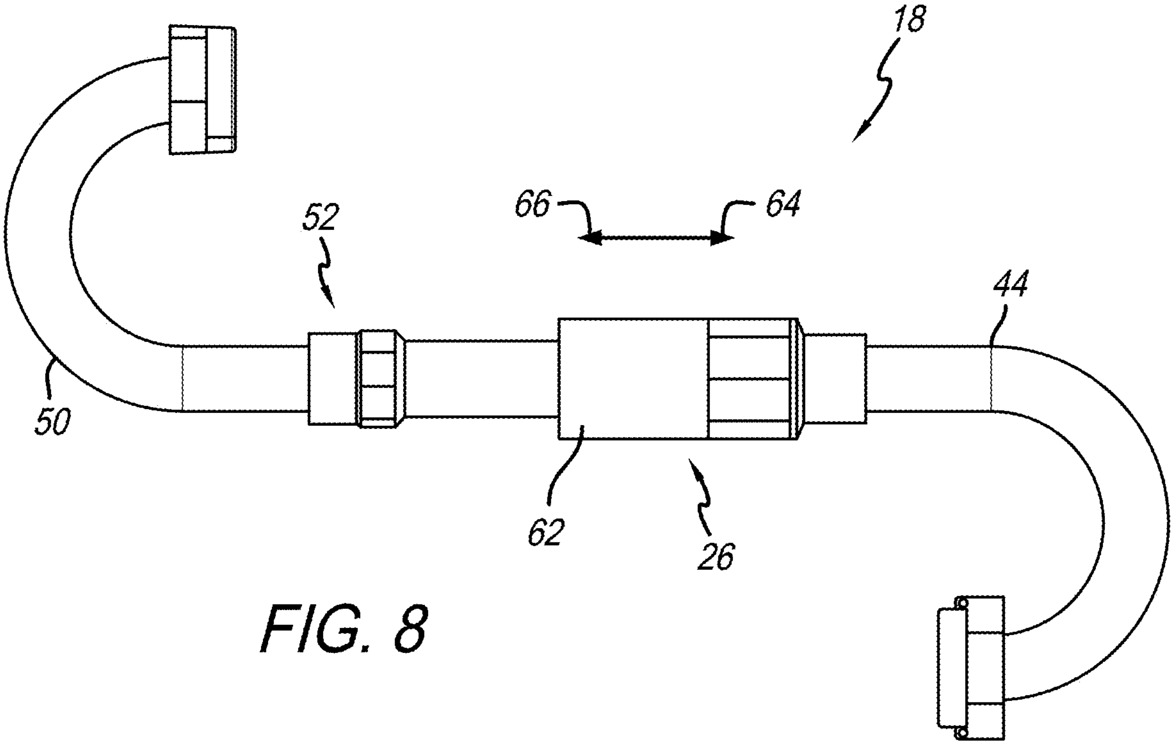
FIG. 8 is another top view of the expandable S-tube.

When moving arcuate inlet tube 44, coupling 8 is not needed to be attached to anything. This allows it to move in either direction 66 or 64, as needed, to couple to the pressure regulating valve. Top views of expandable S-tube 18 is shown in FIGS. 7 and 8. In these views, both S-tubes 18 are the same, except that in FIG. 7, arcuate inlet tube 44 is coupled to body 62 of expansion coupling 26 and is moved in direction 66 to limit the length of expandable S-tube 18. Conversely, as shown in FIG. 8, arcuate inlet tube 44 is extended outward in direction 64 to increase the length of expandable S-tube 18. It is appreciated that depending on how expandable S-tube 18 is connected to meter 4, or other structures, it can influence whether it is arcuate inlet tube 44 or arcuate outlet tube 50 that moves in order to accommodate a longer or shorter pressure regulating valve. In certain embodiments, either arcuate inlet tube 44 can be movable relative to outlet tube 50 or outlet tube 50 can be movable relative to inlet tube 44 to extend or retract S-tube 18 based on these needs.

Figure 9:
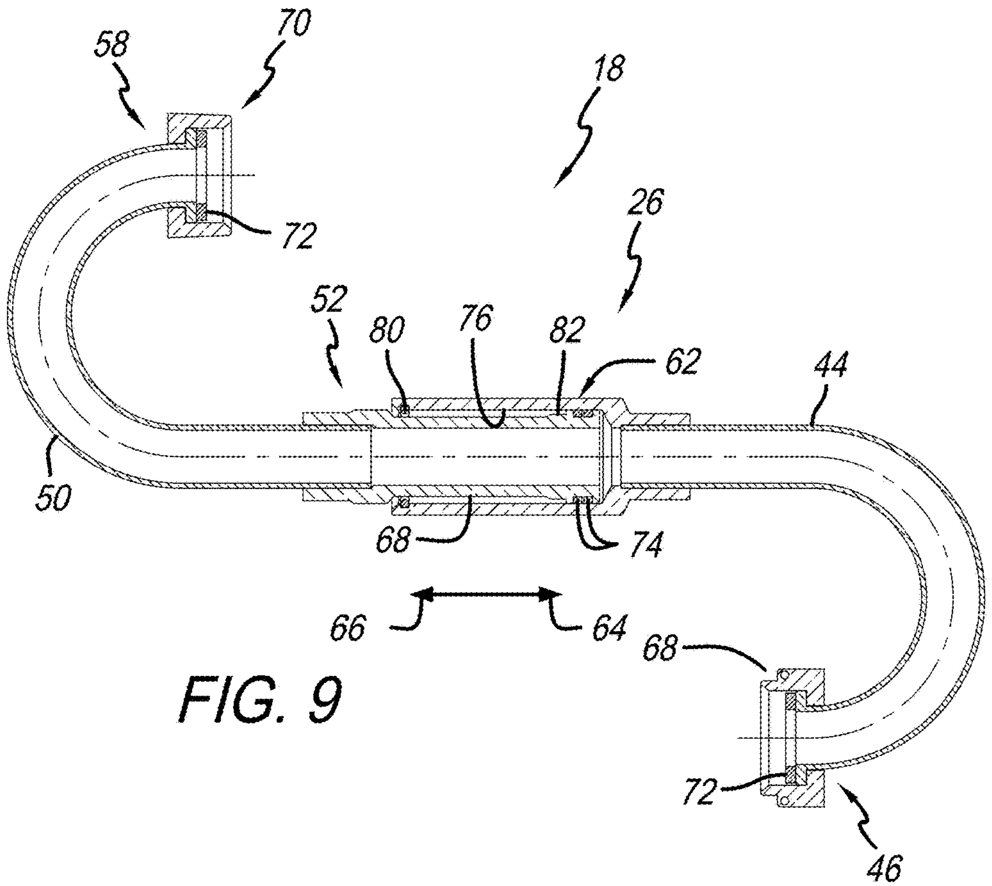
FIG. 9 is a top cross-sectional view of the expandable S-tube.
Figure 10:
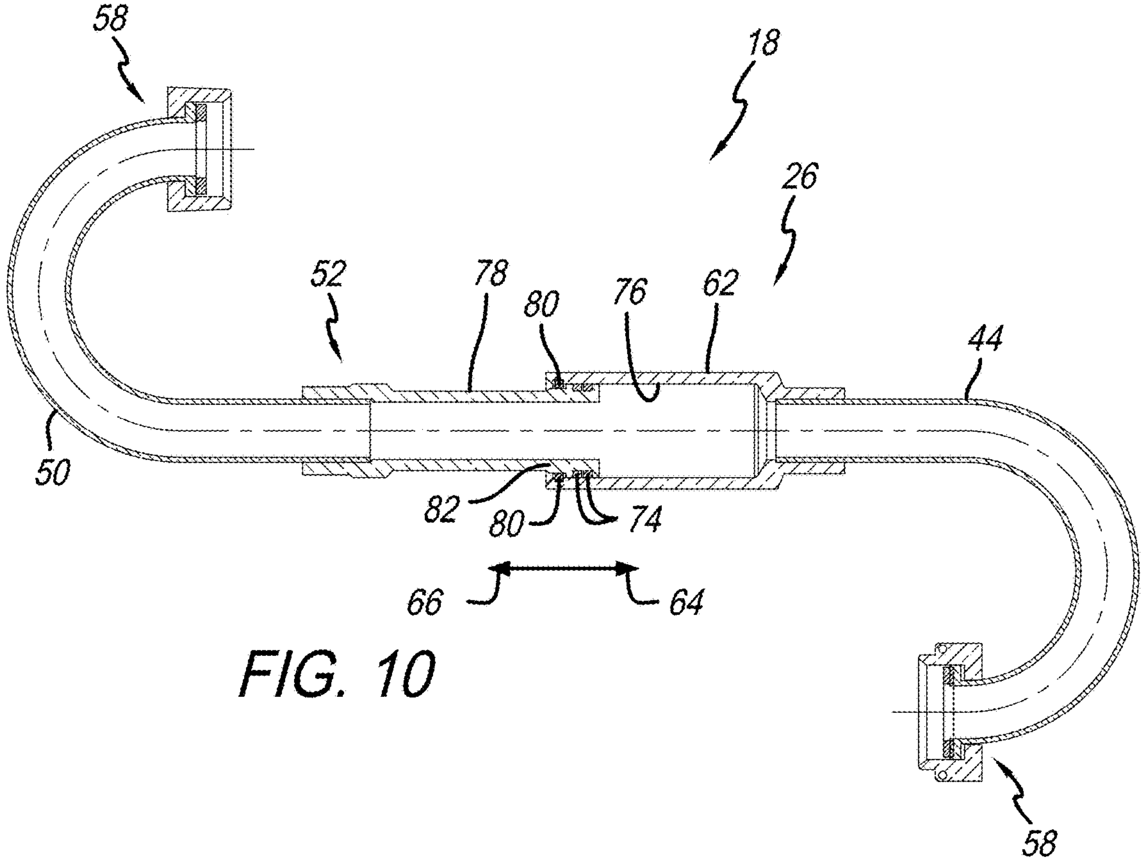
FIG. 10 is another top cross-sectional view of the expandable S-tube.

Top cross-sectional views of expandable S-tube 18 is shown in FIGS. 9 and 10. Similar to the views shown in FIGS. 7 and 8, respectively, the view in FIG. 9 depicts a telescoping tube member 52 retracted in direction 64 within body 62 of expansion coupling 26, while in FIG. 10, telescoping tube member 52 is extended in direction 66 from body 62 of expansion coupling 26. These two views of expandable S-tube 18, similar to that shown in FIGS. 7 and 8, respectively, demonstrate how it can be extended or retracted. Coupling two structures that are longer may require expandable S-tube 18 to expand, whereas coupling two shorter structures may require expandable S-tube 18 to be retracted. This provides flexibility at the installation site making installation more convenient.

These views further demonstrate how, despite being expandable and retractable, expandable S-tube 18 maintains fluid communication from end 46 to end 58. Illustrative coupling nuts 68 and 70 are located at each end 46 and 58, respectively. A gasket 72 may be placed within each of coupling nuts 68 and 70 to provide a sealing structure between adjoining components. To that end, expansion coupling 26 may also include one or more O-rings 74 located between inner periphery surface 76 of body 62 and outer peripheries surface 78 of telescoping tube member 52. O-rings 74 create a seal between body 62 and telescoping tube member 52 to prevent leaking between the two as they take different positions with respect to each other.

A snap ring 80 may be positioned between inner periphery surface 76 of body 62 and outer peripheries surface 78 of telescoping tube member 52 to limit the extent to which telescoping tube member 52 can extend from body 62. A ledge 82, or other like barrier on telescoping tube member 52 creating a protrusion therefrom, is configured to engage snap ring 80 when telescoping tube member 52 extends its furthest distance from body 62. This prevents telescoping tube member 52 and body 62 from decoupling from each other. It is appreciated that the length of telescoping tube member 52 can be adjusted to increase or decrease the maximum range of distance that expandable S-tube 18 may expand too.

Figure 11:
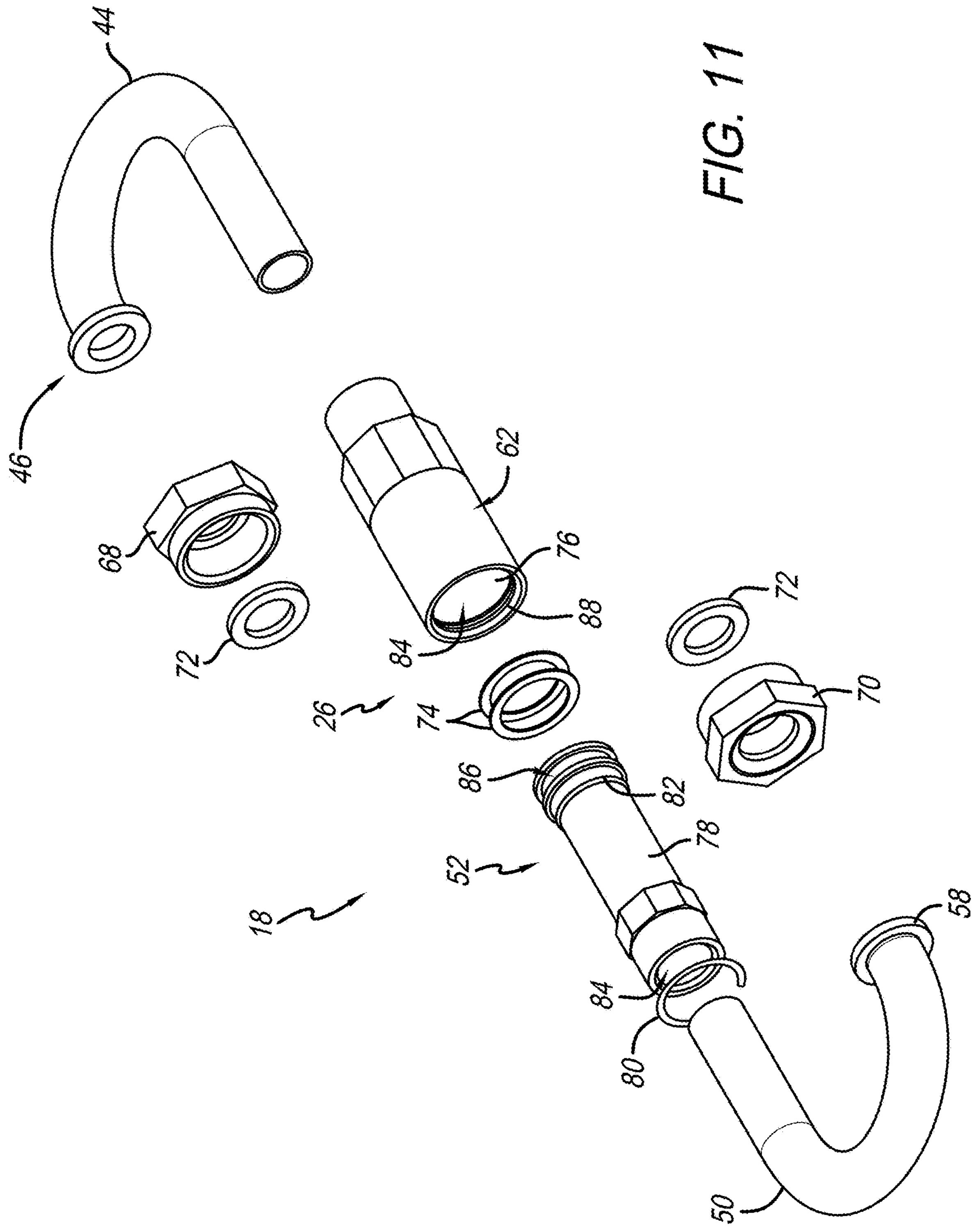
FIG. 11 is an exploded view of the expandable S-tube.

And exploded view of expandable S-tube 18 is shown in FIG. 11. This view shows the circumferential character of the components of S-tube 18 previously identified. For example, expansion coupling 26 includes body 62 and a telescoping tube member 52 forming a passageway 84 that is in fluid communication with both arcuate tubes 44 and 50. O-rings 74 illustratively fit onto telescoping tube member 52 illustratively in channel 86 to provide sealing between body 62 and telescoping tube member 52 to prevent fluid that passes through expansion coupling 26 from leaking between those two structures. Snap ring 80 illustratively fits into channel 88 of body 62 to limit the extent to which telescoping tube member 52 extends. Both O-rings 74 and Snap ring 80 are circumferential structures that encircle telescoping tube member 52. Similarly, coupling nuts 68 and 70, couple to ends 46 and 58 of arcuate tubes 44 and 50, respectively, so they can attach to a pressure reducing valve (not shown) and meter 4, respectively. It is appreciated from this view, as well as the others (see, e.g., FIGS. 9 and 10), how fluid can pass through expandable S-tube 18 while it has the ability to expand or retract.

Another illustrative embodiment of the present disclosure provides an expandable meter pit setter arrangement of alternate design. Meter pit setter assembly 92, like that of meter pit setter assembly 2, includes a meter 4 supported on a mounting plate 94 and in fluid communication with a ball valve 10, coupling 8, and check valve 38, like that shown in FIG. 5. The arrangement shown in FIG. 12, however, has the flow of fluid passing through ball valve 10 to meter 4 occurring underneath mounting plate 94 rather than an S-tube above mounting plate 94. In this arrangement, an expandable U-tube at 96 is predominantly located underneath mounting plate 94.

Figure 12:
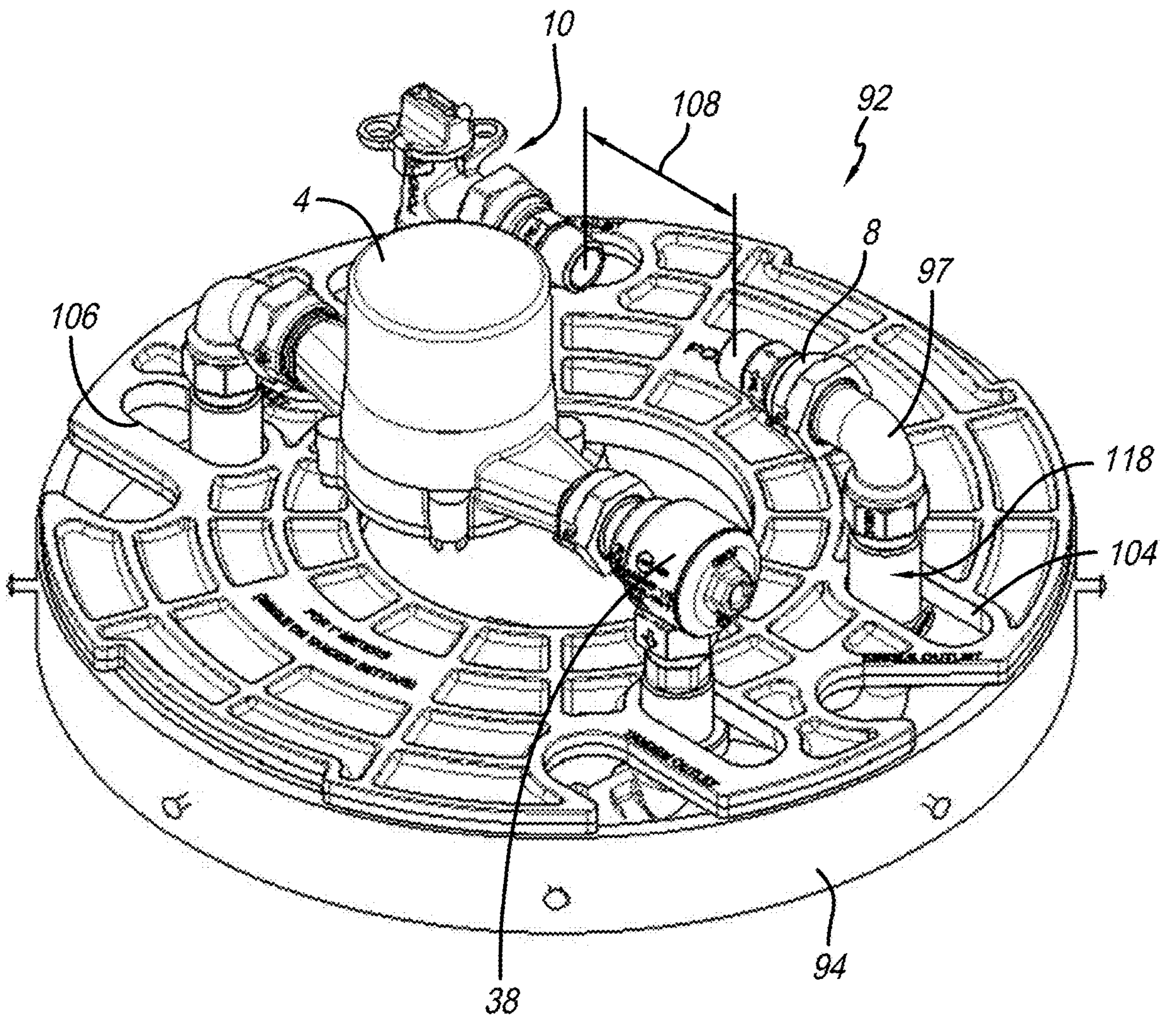
FIG. 12 is a perspective view of a meter pit setter assembly.
Figure 13:
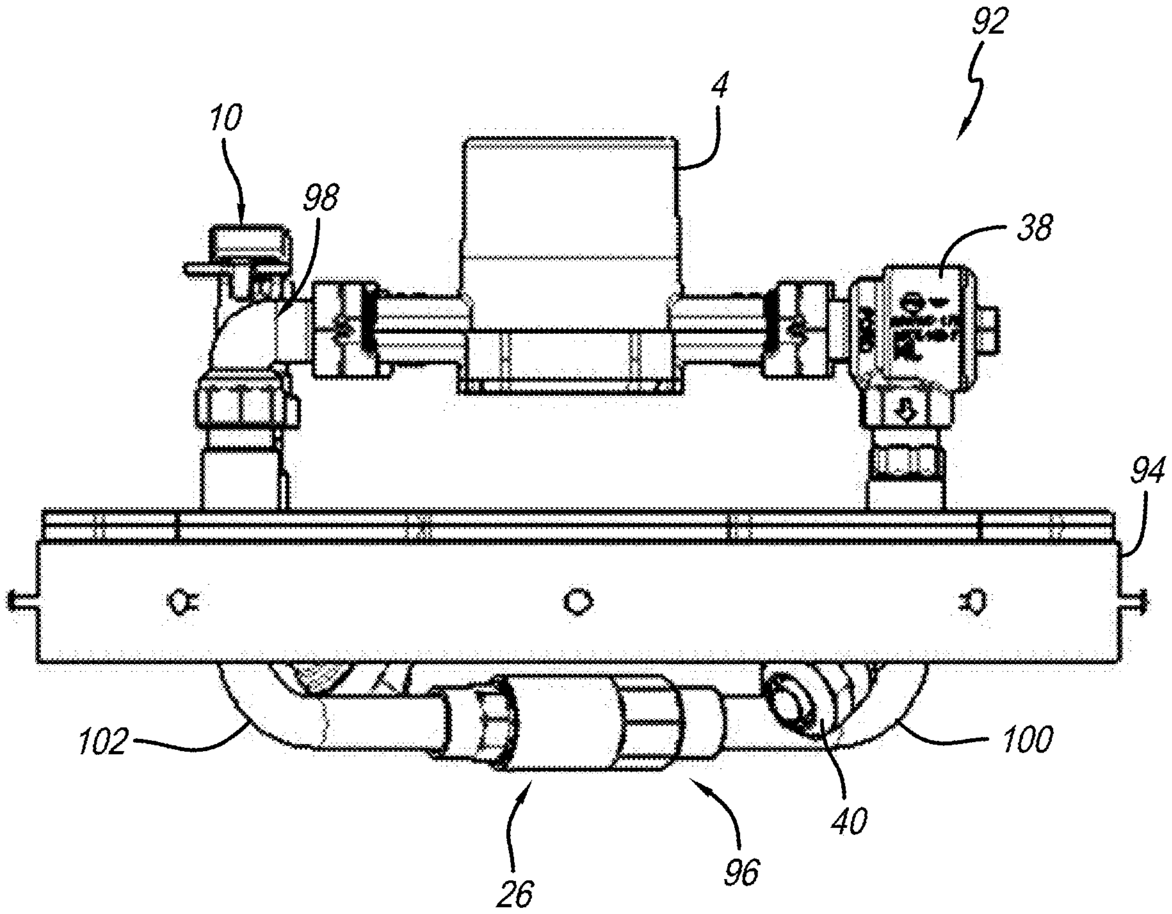
FIG. 13 is a side view of the meter pit setter assembly with an expandable U-tube.

A side view of meter pit setter assembly 92 is shown in FIG. 13 depicting expandable U-tube 96 located underneath mounting plate 94 and extending upward above same to connect to both coupling 8 (not shown in this view) and elbow coupling 98, which provides the fluid communication into meter 4. Like meter pit setter assembly 2 and meter pit setter assembly 92, fluid from a fluid source passes through ball valve 10, through a pressure reducing valve (not shown), and coupling 8, which then passes through expandable U-tube 96 and into meter 4. That fluid then exits through check valve 38, outlet end 40, and into the dwelling or building. Again, because a pressure reducing valve may be provided in different lengths, expansion coupling 26 is fluidly coupled to elbow inlet tube 100 on one side and elbow outlet tube 102 on the other side. Elbow inlet tube 100 is fluidly coupled to coupling 8, which receives the fluid that passes through the pressure reducing valve and elbow outlet tube 102, coupled to expansion coupling 26, as well as elbow coupling 98, which allows fluid to pass through and into meter 4. Slot 104, as well as slot 106, are disposed through mounting plate 94 (see FIG. 12), which allows expandable U-tube 96 to expand or retract, as needed, to accommodate the different lengths of the pressure reducing valves that may be attached to ball valve 10 and coupling 8, as previously described.

Figure 14:
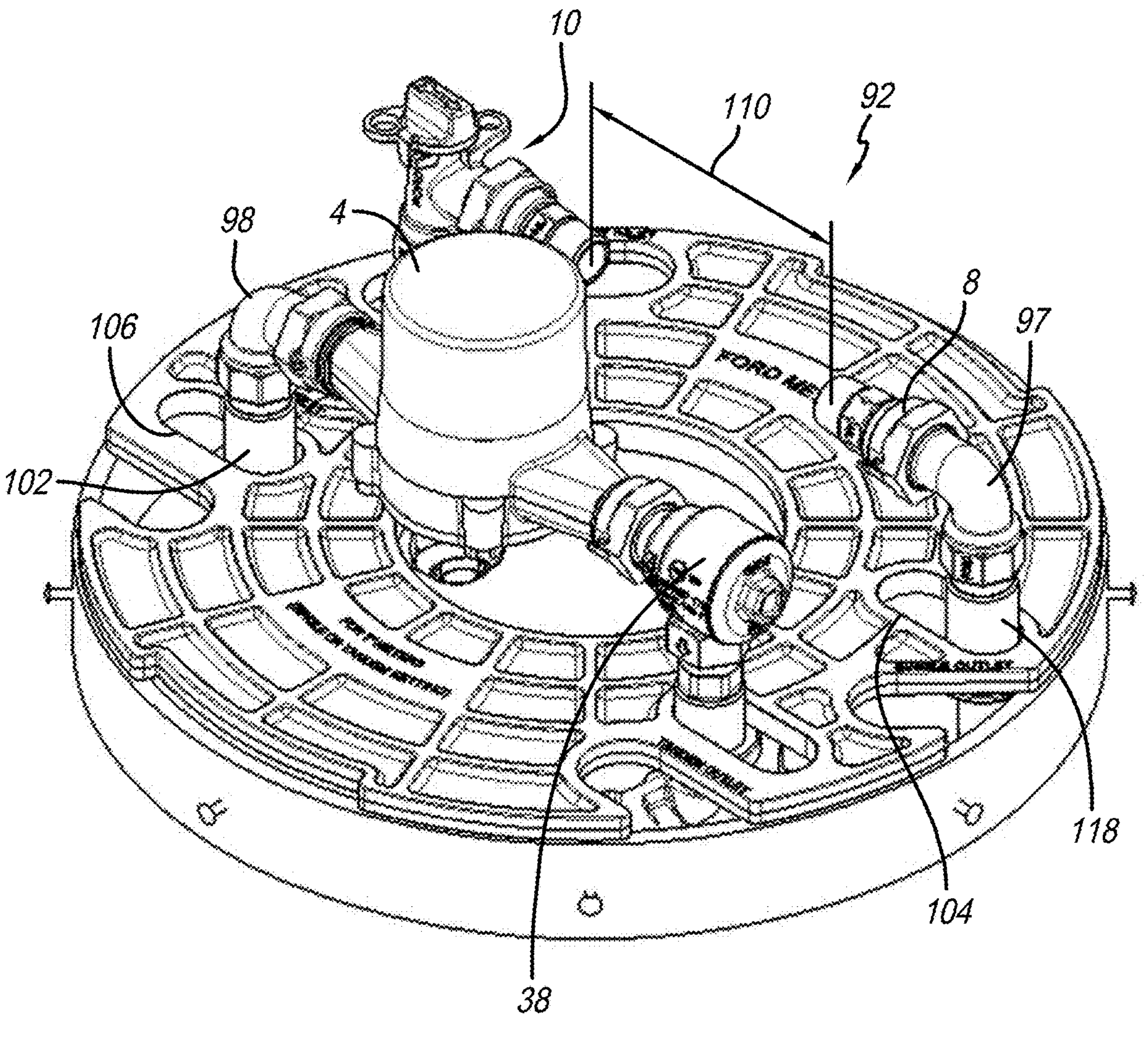
FIG. 14 is another perspective view of the meter pit setter assembly.

Another perspective view of meter pit setter assembly 92, similar to that shown in FIG. 12, is shown in FIG. 14. The difference between these views is that in FIG. 12, distance 108, between the ends of ball valve 10 and coupling 8, is shorter than the distance 110, between the same ball valve 10 and coupling 8, shown in FIG. 14. The remainder of these assemblies are the same. It is only that a longer pressure reducing valve can be inserted between ball valve 10 and coupling 8 as shown in FIG. 14. This is accomplished by expanding expansion coupling 26 like that described in the previous embodiment, which increases the distance between ball valve 10 and coupling 8. As shown in FIG. 14, elbow inlet tube 100 and inlet coupling 118 are positioned further back within slot 104 than that shown in FIG. 12.

Figure 15:
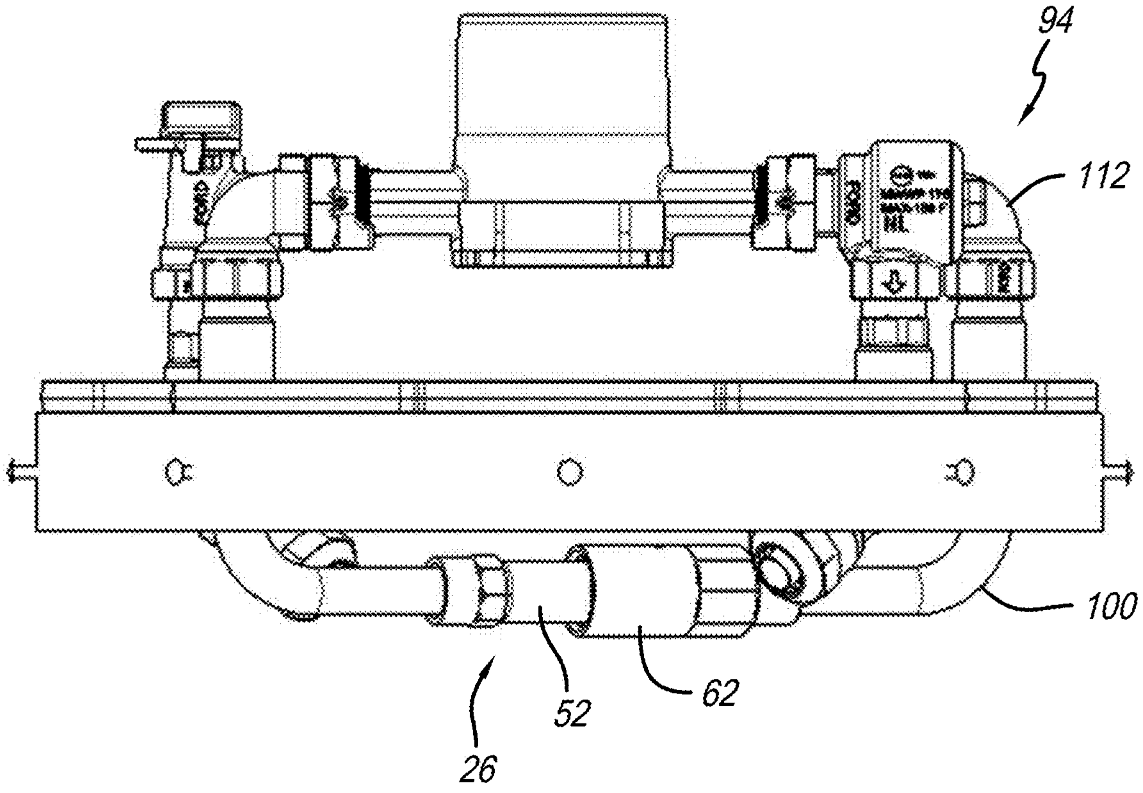
FIG. 15 is another side view of the meter pit setter assembly with the expandable U-tube.

Another side view of meter pit setter assembly 92 is shown in FIG. 15. This view depicts expansion coupling 26, with telescoping tube member 52 expanded, as compared to that shown in FIG. 13 causing body 62 to move elbow inlet tube 100 outward. This moves inlet coupling 118, attached to coupling 8, further outward to create the increased distance 110 as shown in FIG. 14.

Figure 16:
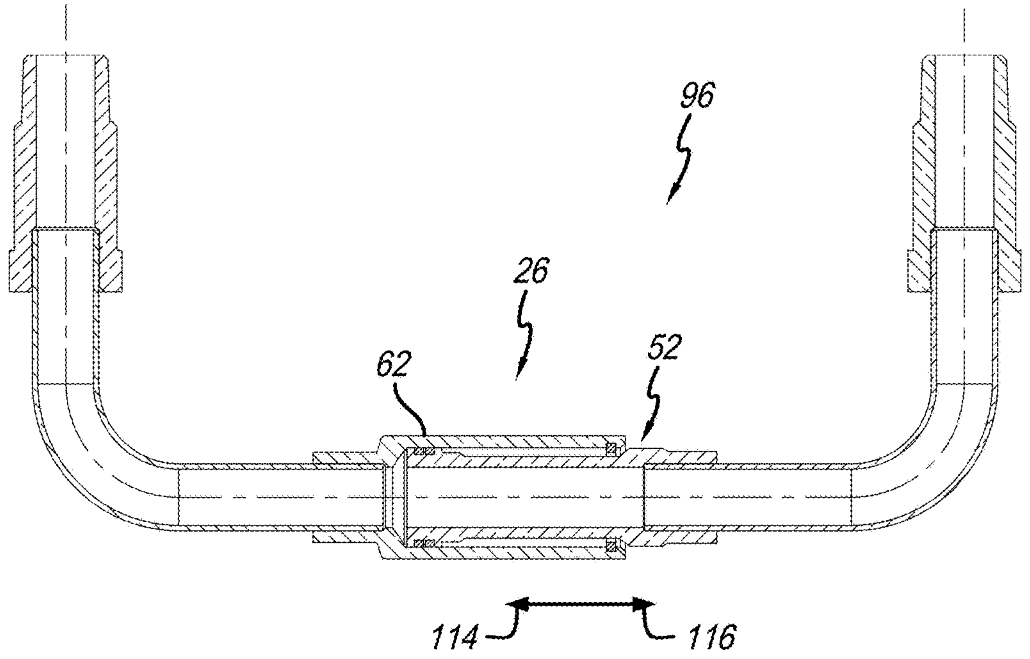
FIG. 16 is a side cross-sectional view of the expandable U-tube.
Figure 17:
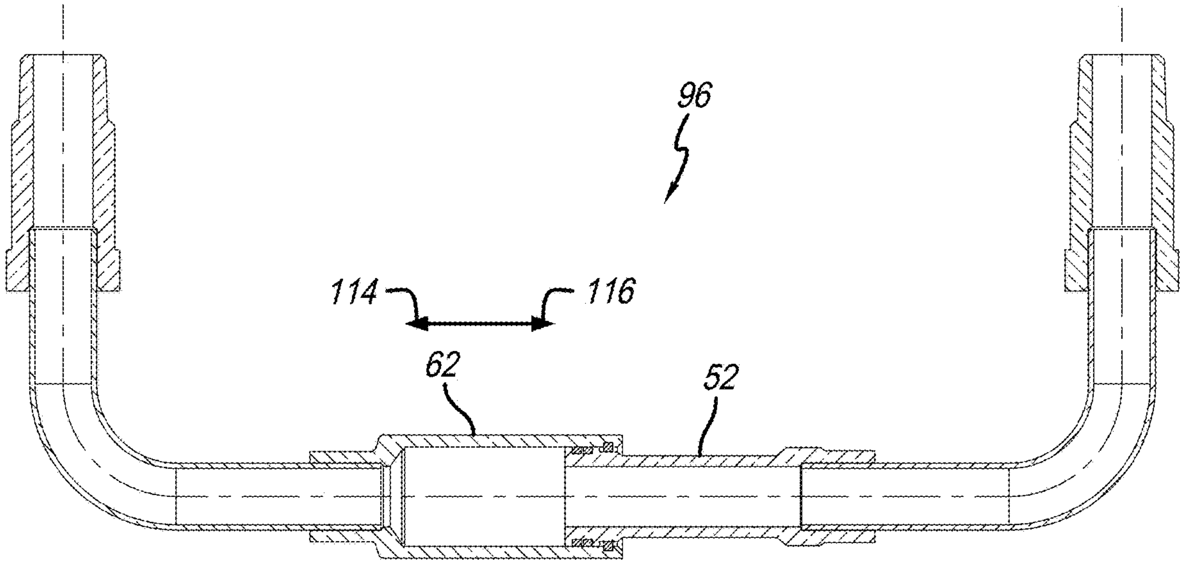
FIG. 17 is another side cross-sectional view of the expandable U-tube.

Side cross-sectional views of expandable U-tube 96 is shown in FIGS. 16 and 17. The view in FIG. 16 depicts telescoping tube member 52 of expansion coupling 26 retracted in direction 114 within body 62. In contrast, and shown in FIG. 17, telescoping tube member 52 is extended in direction 116 from body 62 of expansion coupling 26 in order to extend the length of expandable U-tube 96. These two views demonstrate how expandable U-tube 96 can be extended or retracted, as needed, depending on the length of the pressure reducing valve that will be coupled thereto. Like that discussed with respect to expandable S-tube 18, expandable U-tube 96 provides flexibility at the installation site making such installation more convenient.

Figure 18:
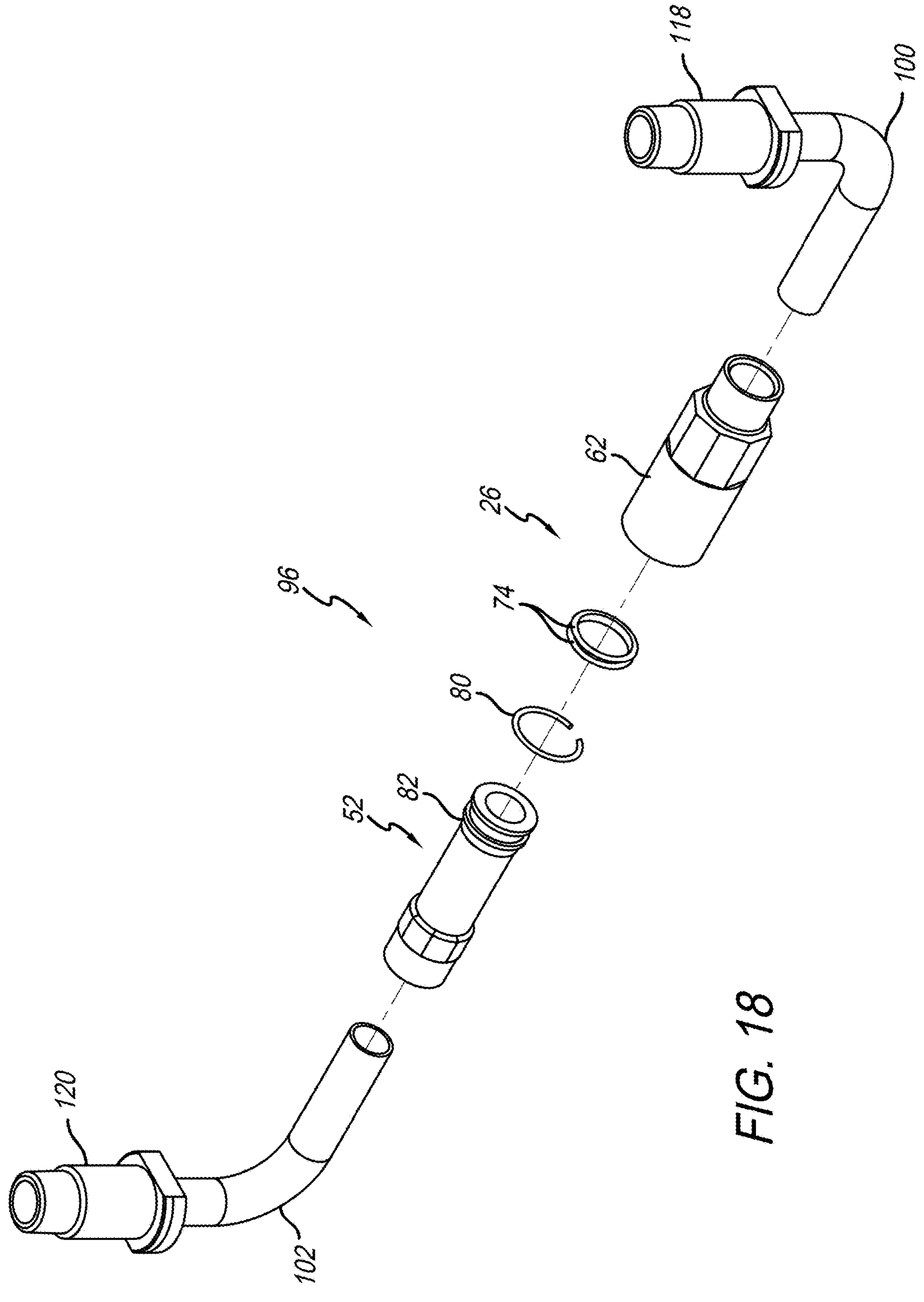
FIG. 18 is a perspective exploded view of the expandable U-tube.

An exploded view of expandable U-tube 96 is shown in FIG. 18. It is appreciated that the structures of expansion coupling 26 can be the same as that described with respect to S-tube 19. For example, expansion coupling 26, shown in FIG. 18, includes telescoping tube member 52 that fits within body 62 with one or more O-rings 74 positioned about telescoping tube member 52 and snap ring 80 configured to engage ledge 82 to limit extension. A difference is that rather than expansion coupling 26 being coupled to arcuate inlet tube 44 and arcuate outlet tube 50, expansion coupling 26 of expandable U-tube 96 couples to elbow inlet tube 100 and elbow outlet tube 102. Illustratively, couplings 118 and 120 may be attached to the ends of elbow inlet tube 100 and elbow outlet tube 102, respectively, to attach to elbows such as elbow 97 that connects to coupling 8, or elbow coupling 98 that couples to meter 4 (see, also, FIG. 14). It is appreciated that other coupling schemes may be attached to expandable U-tube 96 to accommodate other coupling systems as desired.

Figure 19:
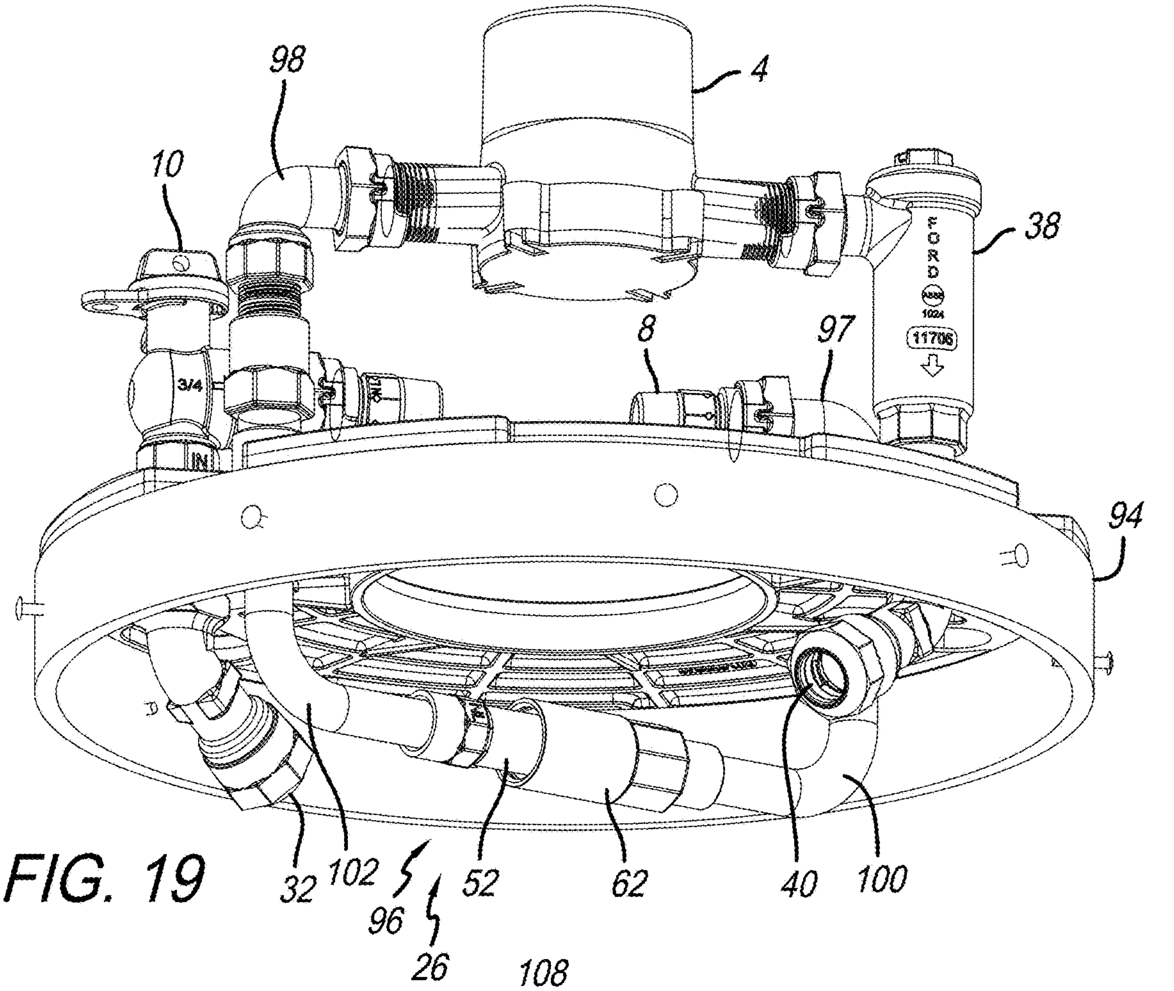
FIG. 19 is an underside perspective view of the meter pit setter with the expandable U-tube.
Figure 20:
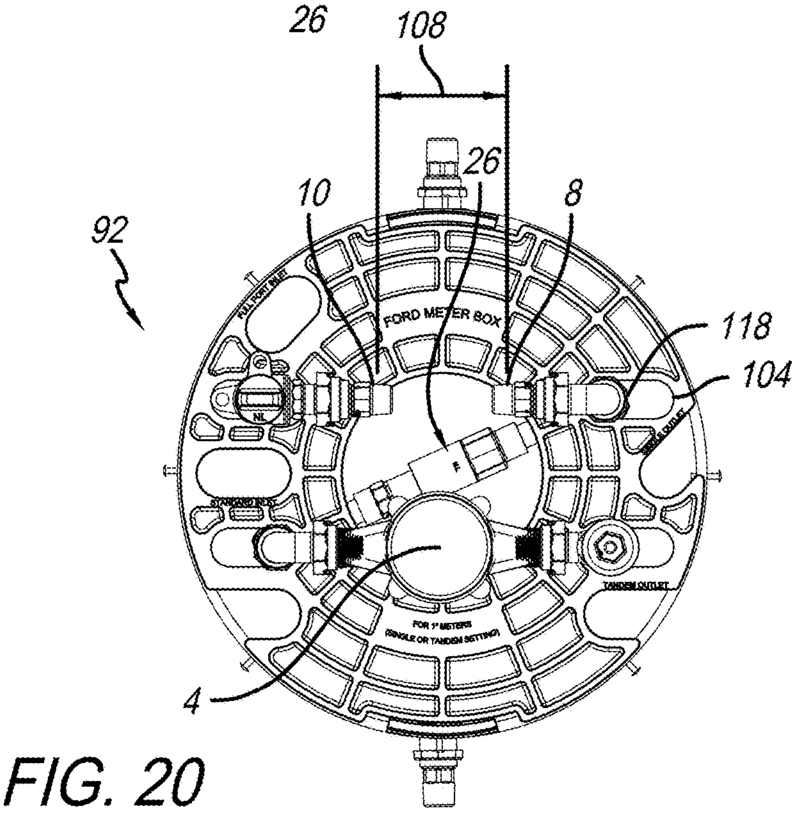
FIG. 20 is a top view of the meter pit setter with the expandable U-tube.

Underside perspective and top views of meter pit setter assembly 92, with expansion coupling 26 in a retracted position, is shown in FIGS. 19 and 20, respectively. In contrast to the previous embodiment, expansion coupling 26 is positioned under mounting plate 94 with ball valve 10, meter 4, and check valve 38 located on top. Additionally, coupling 8 that attaches to a pressure regulating valve, which is also in fluid communication with ball valve 10, will likewise be located above mounting plate 94.

Also shown in FIG. 19 is inlet end 32 and outlet end 40. This underside view further depicts how expandable U-tube 96 is configured such that expansion coupling 26 can be located underneath mounting plate 94, while elbow inlet tube 100 and elbow outlet tube 102 extend upward so that couplings 118 and 120 can fluidly attach to elbow coupling 98 and elbow 97. With telescoping tube member 52 retracted toward body 62, a shorter distance is created between ball valve 10 and coupling 8, as demonstrated by distance 108 shown in FIG. 20. Also shown therein is how coupling 118 is moved further inward in slot 104 similar to that shown in FIG. 12. This creates the shorter distance 108 between coupling 8 and ball valve 10.

Figure 21:
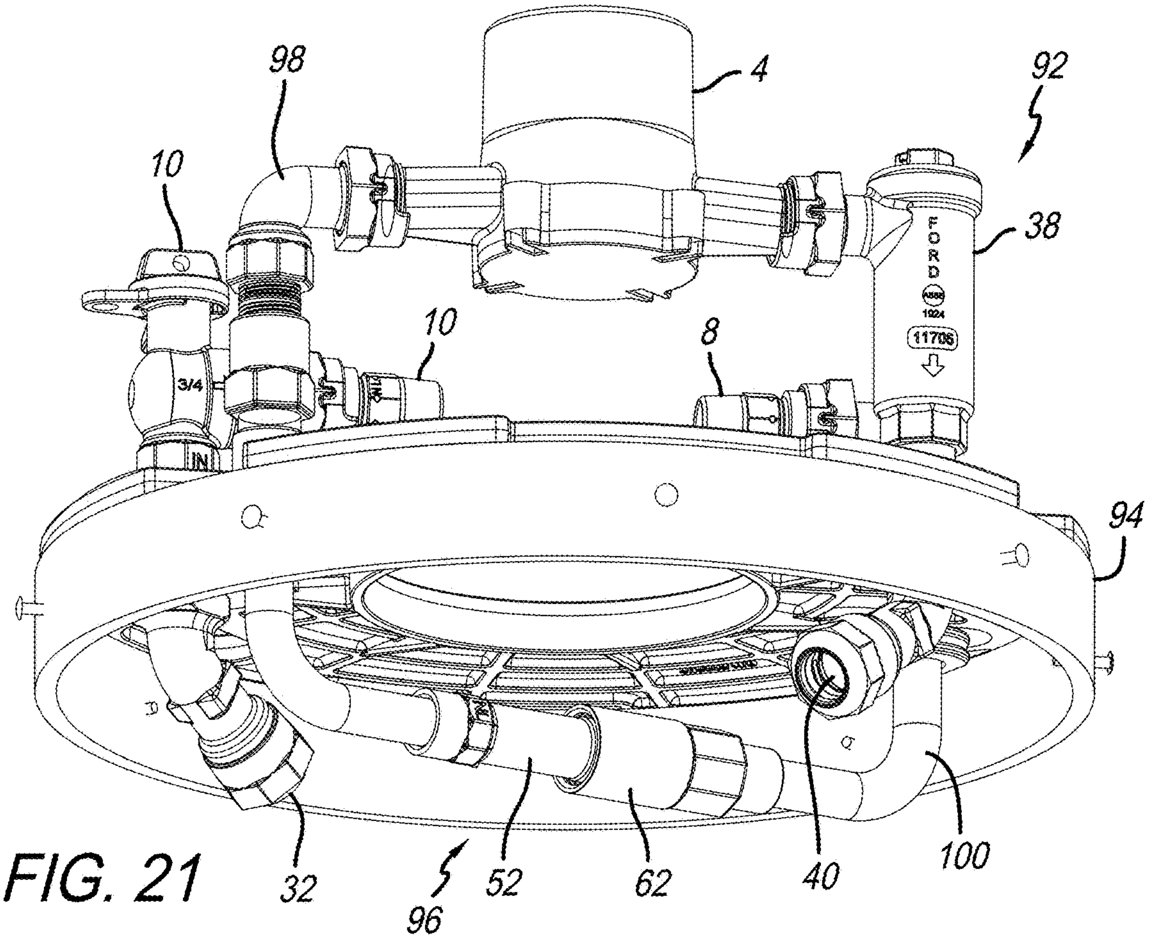
FIG. 21 is another underside perspective view of the meter pit setter with the expandable U-tube.
Figure 22:
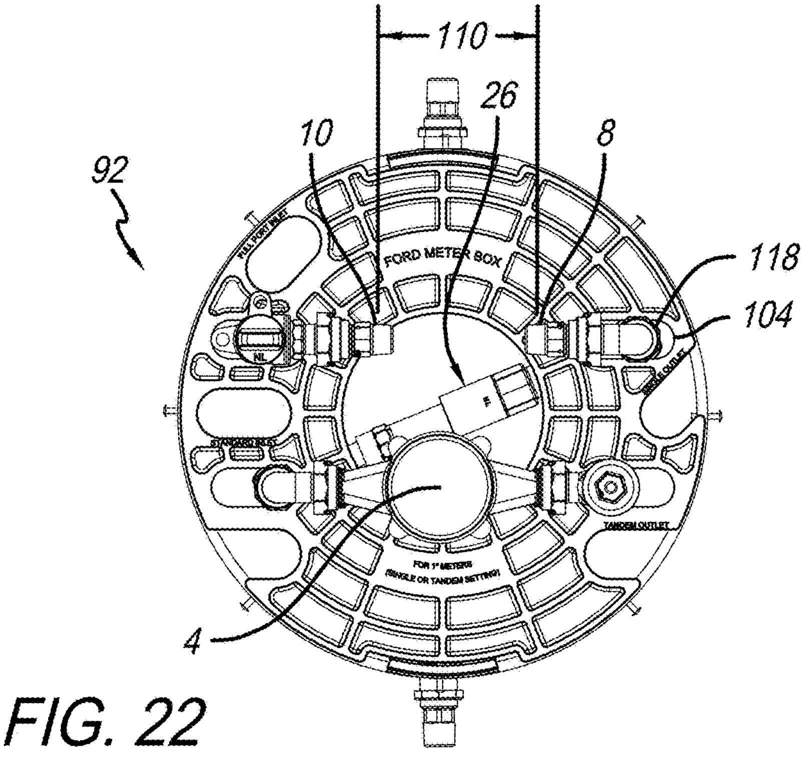
FIG. 22 is another top view of the meter pit setter with the expandable U-tube.

In contrast, the perspective underside and top views of meter pit setter assembly 92, shown in FIGS. 21 and 22, respectively, demonstrate the configuration of expandable U-tube 96 when in an expanded configuration to accommodate a larger pressure reducing valve. In this case, telescoping tube member 52 extends from body 62, which moves same, thereby moving elbow inlet tube 100, which expands the distance between coupling 8 and ball valve 10, represented by distance 110 (see, also, FIG. 14). This expansion of expandable U-tube 96 is done underneath mounting plate 94, opposite coupling 8, ball valve 10, pressure reducing valve (not shown), and meter 4. The top view of meter pit setter assembly 92 depicts how coupling 118 is moved back further within slot 104 in contrast to that shown in FIG. 20. This allows elbow inlet tube 100 to move further away from ball valve 10, thereby increasing the distance between it and coupling 8 in order to accommodate the larger pressure reducing valve.

Figure 23:
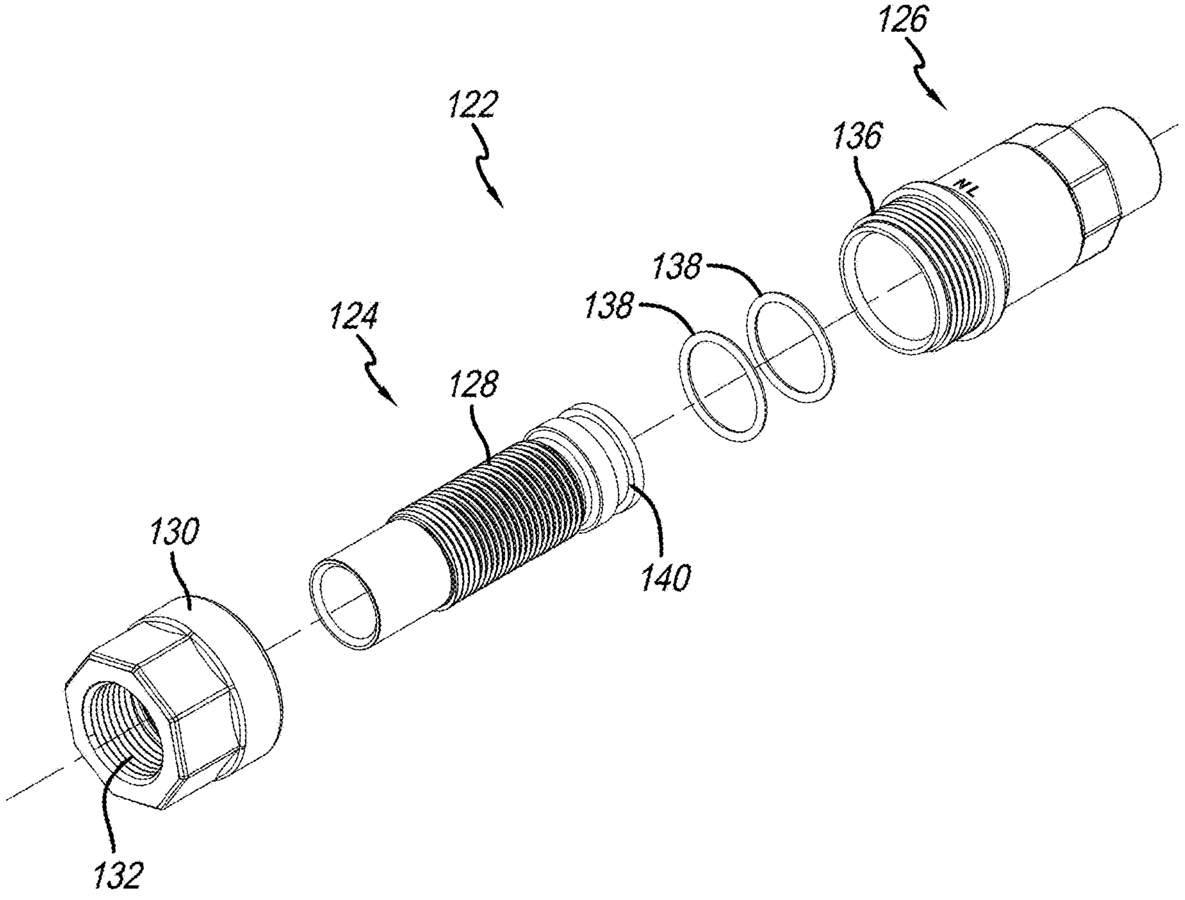
FIG. 23 is an exploded perspective view of an expansion coupling.

Another illustrative embodiment of the present disclosure provides an expansion coupling with a threaded telescoping tube member that is rotatable with respect to a correspondingly threaded collar attached to the body. Extension and retraction of the telescoping tube member is, thus, accomplished by rotating the threaded telescoping tube member. An exploded perspective view of expansion coupling 122 is shown in FIG. 23. Here, there is a telescoping tube member 124, as well as a body 126. The difference between telescoping tube member 52 and telescoping tube member 124, is that the latter includes a threaded outer surface 128, as shown. A collar 130, that includes a threaded inner periphery 132 corresponding to threaded outer surface 128 of threaded telescoping tube member 124, attaches to body 126. Threaded telescoping tube member 124 extends through collar 130 so that threaded outer surface 128 engages threaded inner periphery 132. Collar 130 can be secured onto body 126 via corresponding threads 134 and 136, respectively (see, also, FIG. 24).) O-rings 138 may be fitted within channel 140 of threaded telescoping tube member 124 to maintain a seal between threaded telescoping tube member 124 and body 126. When it is desired to extend threaded telescoping tube member 124 with respect to body 126, either can be rotated so that threaded outer surface 128 of threaded telescoping tube member 124 rotates within threaded inner periphery 132 of collar 130. This rotational movement translates into linear movement of threaded telescoping tube member 124 relative to body 126. In order to contract or expansion coupling 122, either threaded telescoping tube member 124 or body 126 is rotated in an opposite direction to cause the threaded outer surface 128 of threaded telescoping tube member 124 to rotate with respect to threaded inner periphery 132 of collar 130, thereby retracting expansion coupling 122.

Figure 24:
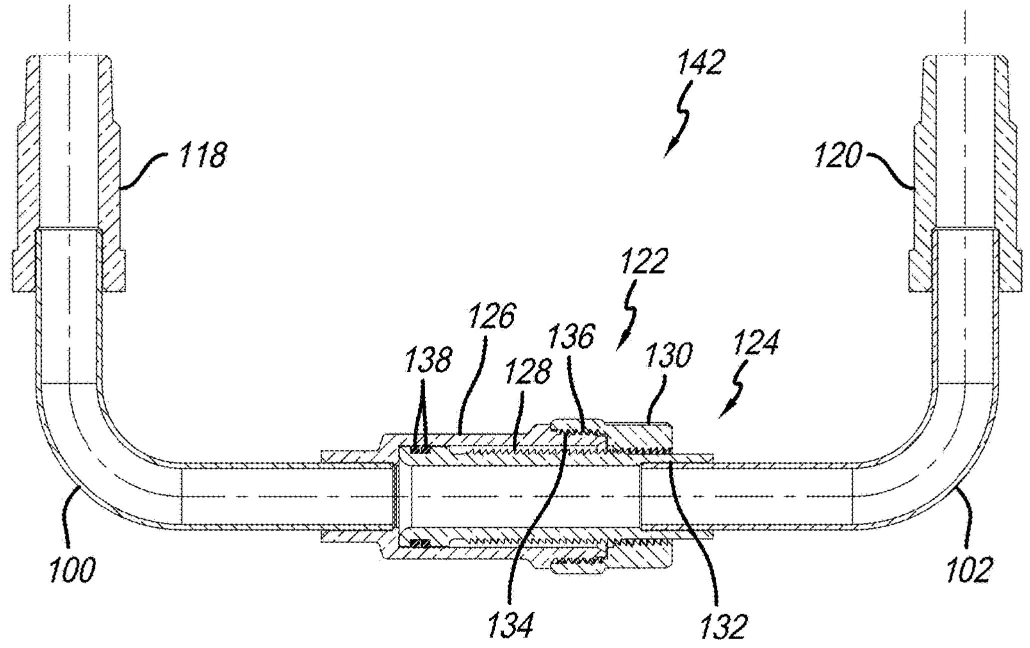
FIG. 24 is a side cross-sectional view of the expandable U-tube with the expansion coupling attached thereto.
Figure 25:
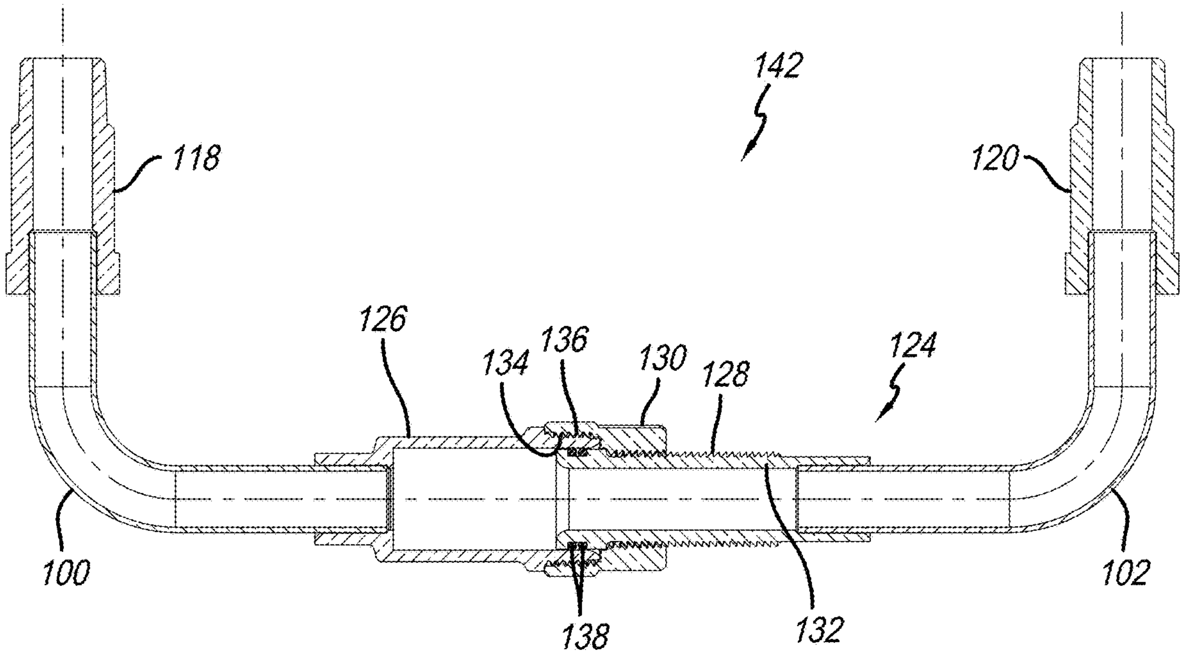
FIG. 25 is another side cross-sectional view of the expandable U-tube with the expansion coupling attached thereto.

A side cross-sectional view of an expandable U-tube 142 is shown in FIGS. 24 and 25. The difference between the views is that threaded telescoping tube member 124 is shown in a retracted position in FIG. 24 as opposed to an expanded position in FIG. 25. Expansion coupling 122 can be attached to the same elbow inlet tube 100 and elbow outlet tube 102, as expandable U-tube 96. The difference is that threaded telescoping tube member 124 is rotated with respect to body 126 in order to linearly extend those components with respect to each other as opposed to just linearly moving telescoping tube member 52 with respect to body 62 of the prior embodiments.

This view in FIG. 24, however, demonstrates how threaded outer surface 128 of threaded telescoping tube member 124 engages corresponding threads of threaded inner periphery 132 of collar 130. This view further demonstrates how threaded surface 134 of body 126 engages threaded surface 136 of collar 130 in order to couple those structures together. It is further appreciated, like in the prior embodiments, expansion coupling 122 provides fluid communication between elbow inlet tube 100 and elbow outlet tube 102.

Figure 26:
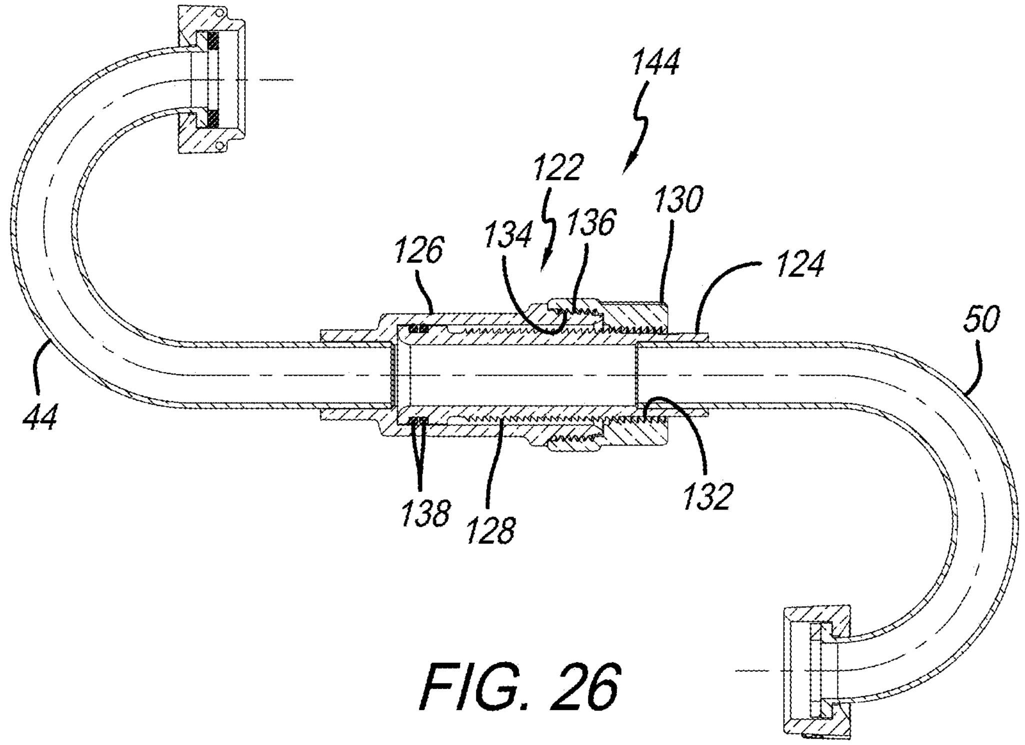
FIG. 26 is a side cross-sectional view of the expandable S-tube with the expansion coupling attached thereto.
Figure 27:
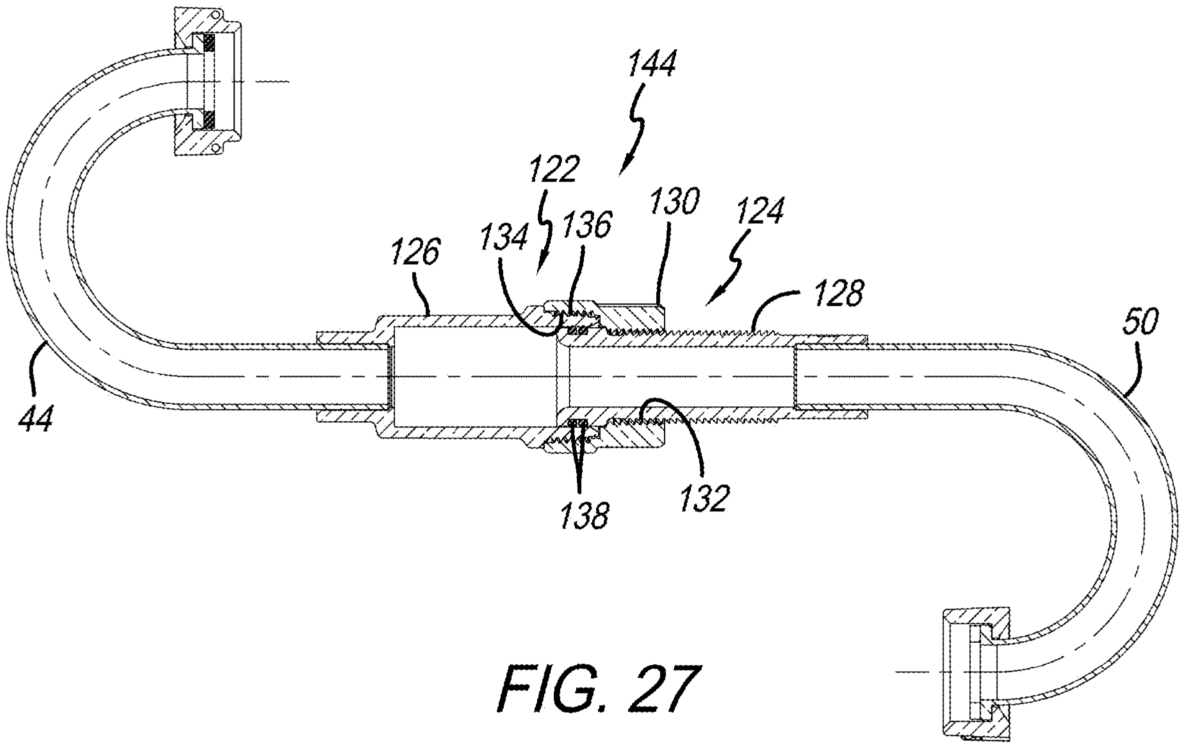
FIG. 27 is another side cross-sectional view of the expandable S-tube with the expansion coupling attached thereto.

In another illustrative embodiment, expansion coupling 122 may also be fluidly attached to arcuate inlet tube 44 and arcuate outlet tube 50 to form an expandable S-tube 144 as shown in FIGS. 26 and 27. Expansion coupling 122 operates in the same way as described in FIGS. 24 and 25. The cross-sectional views of expandable S-tube 144 shown in FIGS. 26 and 27 likewise include threaded telescoping tube member 124 and body 126. The view in FIG. 26, like that shown in FIG. 24, depicts threaded telescoping tube member 124 retracted within body 126. In contrast, FIG. 27 depicts threaded outer surface 128 of threaded telescoping tube member 124 can be rotated in order to move the same linearly with respect to threaded inner periphery 132 of collar 130, which is attached to body 126 expanding expansion coupling 122.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent document conflicts with the priority application, the disclosure from this non-provisional patent document controls.

What is claimed:

1. A meter pit setter assembly that includes an inlet that leads to a ball valve coupling that is in fluid communication with a pressure regulating valve, the pressure regulating valve is also fluidly attached to a coupling fluidly attached to an expandable S-tube, the expandable S-tube comprising:
- a first arcuate tube that has a first opening at a first end of the first arcuate tube and a second opening at a second end of the first arcuate tube and spaced apart from the first opening of the first arcuate tube;
- wherein the first opening of the first arcuate tube is oriented about parallel to the second opening of the first arcuate tube;
- wherein the first end of the first arcuate tube is coupled to a coupling nut of the first arcuate tube;
- wherein the second end of the first arcuate tube is connected to an expansion coupling portion;
- wherein the second end of the first arcuate tube connects to a telescoping tube member of the expansion coupling portion;
- a second arcuate tube that has a first opening at a first end of the second arcuate tube and a second opening at a second end of the second arcuate tube and spaced apart from the first opening of the second arcuate tube;
- wherein the first opening of the second arcuate tube is oriented about parallel to the second opening of the second arcuate tube;

wherein the first end of the second arcuate tube is coupled to a coupling nut of the second arcuate tube;

wherein the second end of the second arcuate tube is connected to the expansion coupling portion;

wherein the second end of the second arcuate tube connects to a body member of the expansion coupling portion;

wherein the telescoping tube member of the expansion coupling portion is coupled to the body member of the expansion coupling portion;

wherein the body member of the expansion coupling portion is linearly movable with respect to the telescoping tube member between an extended position and a retracted position to provide variable lengths of the expandable S-tube;

wherein the expansion coupling portion provides fluid communication from the first arcuate tube to the second arcuate tube; and wherein the first arcuate tube, the second arcuate tube, and the expansion coupling portion form an S-shaped structure of the expandable S-tube.

2. The meter pit setter assembly of claim 1, wherein the telescoping tube member further includes one or more O-rings located between an inner periphery surface of the body member and an outer periphery surface of the telescoping tube member to create one or more seals between the body member and the telescoping tube member to prevent fluid leaking between the body member and the telescoping tube member as the telescoping tube member and the body member move between the extended position and the retracted position with respect to each other.

3. The meter pit setter assembly of claim 1, wherein the telescoping tube member further includes one or more O-rings located between an outer periphery surface of the body member and an inner periphery surface of the telescoping tube member to create one or more seals between the body member and the telescoping tube member to prevent fluid leaking between the body member and the telescoping tube member as the telescoping tube member and the body member move between the extended position and the retracted position with respect to each other.

4. The meter pit setter assembly of claim 1, wherein the telescoping tube member is retractable within the body member.

5. The meter pit setter assembly of claim 2, further comprising a snap ring positioned between the inner periphery surface of the body member and the outer periphery surface of the telescoping tube member to limit an extent to which the body member and the telescoping tube member extend from each other.

6. The meter pit setter assembly of claim 5, further comprising a ledge extending from the telescoping tube member that creates a protrusion therefrom, and is configured to engage the snap ring to prevent the body member and the telescoping tube member from decoupling from each other.

7. The meter pit setter assembly of claim 1, wherein the coupling nut of the first arcuate tube is configured to fluidly attach to a meter and the coupling nut of the second arcuate tube is configured to fluidly attach to the coupling for the pressure regulating valve.

8. The meter pit setter assembly of claim 1, wherein the first arcuate tube and the second arcuate tube are the same shape.

9. The meter pit setter assembly of claim 1, wherein an outer periphery surface of the telescoping tube member includes threads that correspond to and engage threads of an inner periphery surface of the body member such that rotation of either the body member or the telescoping tube member, with respect to each other, linearly extends or retracts the body member with respect to the telescoping tube member, dependent on a direction of the rotation.

10. A meter pit setter assembly that includes an inlet that leads to a ball valve coupling that is in fluid communication with a pressure regulating valve, the pressure regulating valve is also fluidly attached to a coupling fluidly attached to an expandable S-tube, the expandable S-tube comprising:

a first arcuate tube that has a first opening at a first end of the first arcuate tube and a second opening at a second end of the first arcuate tube and spaced apart from the first opening of the first arcuate tube;

wherein the second end of the first arcuate tube is connected to an expansion coupling portion;

wherein the second end of the first arcuate tube connects to a telescoping tube member of the expansion coupling portion;

a second arcuate tube that has a first opening at a first end of the second arcuate tube and a second opening at a second end of the second arcuate tube and spaced apart from the first opening of the second arcuate tube;

wherein the second end of the second arcuate tube is connected to the expansion coupling portion;

wherein the second end of the second arcuate tube connects to a body member of the expansion coupling portion;

wherein the telescoping tube member of the expansion coupling portion is coupled to the body member of the expansion coupling portion;

wherein the body member of the expansion coupling portion is movable with respect to the telescoping tube member between an extended position and a retracted position to provide variable lengths of the expandable S-tube;

wherein the expansion coupling portion provides fluid communication from the first arcuate tube to the second arcuate tube; and wherein the first arcuate tube, the second arcuate tube, and the expansion coupling portion form an S-shaped structure of the expandable S-tube.

11. The meter pit setter assembly of claim 10, wherein the first arcuate tube is configured to fluidly attach to a meter and the second arcuate tube is configured to fluidly attach to the coupling for the pressure regulating valve.

12. The meter pit setter assembly of claim 10, wherein the first arcuate tube is configured to fluidly attach to the coupling for the pressure regulating valve and the second arcuate tube is configured to fluidly attach to a meter.

13. The meter pit setter assembly of claim 10, wherein the first opening of the first arcuate tube is oriented about parallel to the second opening of the first arcuate tube and wherein the first end of the first arcuate tube is coupled to a coupling nut of the first arcuate tube.

14. The meter pit setter assembly of claim 10, wherein the first opening of the second arcuate tube is oriented about parallel to the second opening of the second arcuate tube and wherein the first end of the second arcuate tube is coupled to a coupling nut of the second arcuate tube.

15. The meter pit setter assembly of claim 10, wherein the body member of the expansion coupling portion is linearly movable with respect to the telescoping tube member.

16. A meter pit setter assembly that includes an inlet that leads to a ball valve coupling that is in fluid communication with a pressure regulating valve, the pressure regulating valve is also fluidly attached to a coupling fluidly attached to an expandable U-tube, the expandable U-tube comprising:

a first angled tube that has a first opening at a first end of the first angled tube and a second opening at a second end of the first angled tube and spaced apart from the first opening of the first angled tube;

wherein the first opening of the first angled tube is oriented tangential to the second opening of the first angled tube;

wherein the second end of the first angled tube is connected to an expansion coupling portion;

wherein the second end of the first angled tube connects to a telescoping tube member of the expansion coupling portion;

a second angled tube that has a first opening at a first end of the second angled tube and a second opening at a second end of the second angled tube and spaced apart from the first opening of the second angled tube;

wherein the first opening of the second angled tube is oriented tangential to the second opening of the second angled tube;

wherein the second end of the second angled tube is connected to the expansion coupling portion;

wherein the second end of the second angled tube connects to a body member of the expansion coupling portion;

wherein the telescoping tube member of the expansion coupling portion is coupled to the body member of the expansion coupling portion;

wherein the body member of the expansion coupling portion is linearly movable with respect to the telescoping tube member between an extended position and a retracted position to provide variable lengths of the expandable U-tube;

wherein the expansion coupling portion provides fluid communication from the first angled tube to the second angled tube; and wherein the first angled tube, the second angled tube, and the expansion coupling portion form an U-shaped structure of the expandable U-tube.

17. The meter pit setter assembly of claim 16, wherein the first opening of the first angled tube is oriented about perpendicular to the second opening of the first angled tube and wherein the first opening of the second angled tube is oriented about perpendicular to the second opening of the second angled tube.

18. The meter pit setter assembly of claim 16, wherein the first angled tube is configured to fluidly attach to a meter and the second angled tube is configured to fluidly attach to the coupling for the pressure regulating valve.

19. The meter pit setter assembly of claim 16, wherein the first angled tube is configured to fluidly attach to the coupling for the pressure regulating valve and the second angled tube is configured to fluidly attach to a meter.

20. The meter pit setter assembly of claim 1, wherein an outer periphery surface of the telescoping tube member includes threads that correspond to and engage threads of an inner periphery surface of the body member such that rotating either the body member for the telescoping tube member such that rotation of either the body member or the telescoping tube member with respect to each other linearly extends or retracts the body member with respect to the telescoping tube member dependent on a direction of the rotation.

* * * * *